United States Patent
Kim et al.

(10) Patent No.: US 12,089,030 B2
(45) Date of Patent: Sep. 10, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Yangwook Kim, Suwon-si (KR); Seungho Lee, Suwon-si (KR); Woohyun Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 17/851,795

(22) Filed: Jun. 28, 2022

(65) Prior Publication Data
US 2022/0329966 A1 Oct. 13, 2022

Related U.S. Application Data

(63) Continuation of application No. 16/847,947, filed on Apr. 14, 2020, now Pat. No. 11,412,341.

(30) Foreign Application Priority Data

Sep. 5, 2019 (KR) .................. 10-2019-0110352

(51) Int. Cl.
*H04S 7/00* (2006.01)
*G06F 3/16* (2006.01)
(Continued)

(52) U.S. Cl.
CPC ............... *H04S 7/304* (2013.01); *G06F 3/16* (2013.01); *G06N 3/008* (2013.01); *G06N 3/04* (2013.01); *G06N 3/08* (2013.01); *H04R 3/00* (2013.01)

(58) Field of Classification Search
CPC . H04R 3/00; H04R 3/04; H04R 3/005; H04R 3/12; H04R 5/00; H04R 5/027;
(Continued)

(56) References Cited

U.S. PATENT DOCUMENTS 8,194,865 B2 6/2012 Goldstein et al.
9,226,090 B1 12/2015 Norris
(Continued)

FOREIGN PATENT DOCUMENTS

JP 2004023180 A * 1/2004 ............... H04S 7/00
JP WO2017/195616 A1 11/2017
(Continued)

OTHER PUBLICATIONS

International Search Report dated Jun. 17, 2020 issued by the International Searching Authority in counterpart International Application No. PCT/KR2020/002513 (PCT/ISA/210).
(Continued)

*Primary Examiner* — Thang V Tran
(74) *Attorney, Agent, or Firm* — Sughrue Mion, PLLC

(57) ABSTRACT

An electronic apparatus is provided. The electronic apparatus includes a camera, a processor and a memory configured to store at least one instruction executable by the processor where and the processor is configured to input audio data to an artificial intelligence model corresponding to user information, and obtain output audio data from the artificial intelligence model, and the artificial intelligence model is a model learned based on first learning audio data obtained by recording a sound source with a first recording device, second learning audio data obtained by recording the sound source with a second recording device, and information on a recording device for obtaining the second learning audio data, and the second learning audio data is binaural audio data.

29 Claims, 31 Drawing Sheets

Related U.S. Application Data

(60) Provisional application No. 62/874,056, filed on Jul. 15, 2019.

(51) Int. Cl.
  *G06N 3/00* (2023.01)
  *G06N 3/008* (2023.01)
  *G06N 3/04* (2023.01)
  *G06N 3/08* (2023.01)
  *H04R 3/00* (2006.01)

(58) Field of Classification Search
  CPC ... H04S 7/00; H04S 7/30; H04S 7/302; H04S 7/303; H04S 7/304; G06F 3/01; G06F 3/011; G06F 3/012; G06F 3/013; G06F 3/16; G06N 3/00; G06N 3/02; G06N 3/04; G06N 3/08; G06N 3/008
  See application file for complete search history.

(56) References Cited

U.S. PATENT DOCUMENTS

| | | | |
|---|---|---|---|
| 9,799,331 B2 | 10/2017 | Kim et al. | |
| 9,860,636 B1 | 1/2018 | Nongpiur | |
| 9,967,693 B1 | 5/2018 | Seamans | |
| 10,009,690 B1 | 6/2018 | Norris | |
| 10,013,975 B2 | 7/2018 | Guo et al. | |
| 10,089,979 B2 | 10/2018 | Chung et al. | |
| 10,237,649 B2 | 3/2019 | Nongpiur | |
| 10,798,516 B2 | 10/2020 | Hayashi et al. | |
| 10,880,667 B1* | 12/2020 | Cho | H04S 7/307 |
| 11,432,095 B1* | 8/2022 | Satongar | H04S 7/304 |
| 2002/0025054 A1* | 2/2002 | Yamada | H04R 3/12 |
| | | | 381/310 |
| 2008/0137870 A1 | 6/2008 | Nicol et al. | |
| 2014/0006033 A1* | 1/2014 | Jung | G10L 15/22 |
| | | | 345/173 |
| 2014/0198918 A1 | 7/2014 | Li | |
| 2017/0048619 A1* | 2/2017 | Bang | A61B 5/12 |
| 2017/0084266 A1 | 3/2017 | Bronakowski et al. | |
| 2017/0148431 A1 | 5/2017 | Catanzaro et al. | |
| 2017/0295439 A1 | 10/2017 | Xu et al. | |
| 2018/0091926 A1 | 3/2018 | Cho et al. | |
| 2018/0115854 A1 | 4/2018 | Hsu et al. | |
| 2018/0173494 A1 | 6/2018 | Choi et al. | |
| 2018/0242094 A1* | 8/2018 | Baek | H04R 5/04 |
| 2018/0359595 A1 | 12/2018 | Son et al. | |
| 2019/0149940 A1 | 5/2019 | Hayashi et al. | |
| 2020/0021938 A1 | 1/2020 | Tu | |
| 2020/0174734 A1 | 6/2020 | Gomes | |
| 2020/0213736 A1 | 7/2020 | Kim et al. | |
| 2020/0221245 A1* | 7/2020 | Mochizuki | H04R 1/403 |
| 2020/0236489 A1* | 7/2020 | Merimaa | H04R 5/033 |
| 2020/0296521 A1* | 9/2020 | Wexler | H04R 25/45 |

FOREIGN PATENT DOCUMENTS

| | | |
|---|---|---|
| KR | 10-2016-0112793 A | 9/2016 |
| KR | 10-1844932 B1 | 4/2018 |
| KR | 10-2018-0069660 A | 6/2018 |
| KR | 10-2020-0084438 A | 7/2020 |

OTHER PUBLICATIONS

International Written Opinion dated Jun. 17, 2020 issued by the International Searching Authority in counterpart International Application No. PCT/KR2020/002513 (PCT/ISA/237).

* cited by examiner

ELECTRONIC APPARATUS AND CONTROLLING METHOD THEREOF

CROSS-REFERENCE TO RELATED APPLICATION(S)

This application is a Continuation Application of U.S. application Ser. No. 16/847,947, filed on Apr. 14, 2020, which is based on and claims priority under 35 U.S.C. § 119 to Korean Patent Application No. 10-2019-0110352, filed on Sep. 5, 2019, in the Korean Intellectual Property Office, which claims the benefit of U.S. Provisional Patent Application No. 62/874,056, filed on Jul. 15, 2019, in the U.S. Patent and Trademark Office, the disclosures of which are herein incorporated by reference in their entireties.

BACKGROUND

Field

Apparatuses and methods consistent with the disclosure relate to an electronic apparatus and a controlling method thereof, and more particularly, to an electronic apparatus that converts an audio signal using an artificial intelligence model, and a controlling method thereof.

Description of the Related Art

A dummy head microphone is a recording device including a microphone attached to a human head model, and a binaural microphone with a simplified dummy head is a recording device with a microphone attached to an ear model. In a typical expression, the binaural microphone includes the dummy head microphone. Recording a sound source using the dummy head microphone or the binaural microphone is called binaural recording, and audio data recorded in such a manner may be referred to as binaural audio data. Because the binaural recording is to record sound using a model similar to a person's actual body organ, the binaural recording may be a method of obtaining audio data similar to the sound actually heard by a person. If the audio data obtained in such a manner is played back in a speaker (e.g., a device such as earphone) close to an eardrum, a listener may experience the feeling of listening to an original sound rather than the recorded sound.

A dummy head or a dummy ear used for the binaural recording is fixed in size. On the other hand, the size of the head and ears of the person listening to the audio data varies from person to person. Therefore, because there is a difference between a user's actual head size (or ear size) and a dummy head size (or dummy ear size), there is a problem in that a user hears a different sound. That is, even if the sound source is recorded using the dummy head microphone, it may be difficult to generate an audio signal suitable for individual users due to the above-described problem.

In addition, an artificial intelligence model learned based on the binaural audio data recorded using the dummy head microphone may convert any audio data like the binaural audio data. However, because the artificial intelligence model is learned in a state in which the dummy head size or the dummy ear size of the binaural recording device is fixed, there is a difference from the head size or the ear size of the user who will listen to the audio data. Therefore, the audio data converted by the artificial intelligence model may not suitable for the user.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

According to an embodiment of the disclosure, an electronic apparatus includes a processor and a memory configured to store at least one instruction executable by the processor where the processor is configured to input audio data to an artificial intelligence model corresponding to user information, and obtain output audio data from the artificial intelligence model, and the artificial intelligence model is a model learned based on first learning audio data obtained by recording a sound source with a first recording device, second learning audio data obtained by recording the sound source with a second recording device, and information on a recording device for obtaining the second learning audio data, and the second learning audio data is binaural audio data.

According to another embodiment of the disclosure, a controlling method of an electronic apparatus that stores at least one instruction executable by the electronic apparatus includes inputting input audio data to an artificial intelligence model corresponding to user information, and obtaining output audio data from the artificial intelligence model where the artificial intelligence model is a model learned based on first learning audio data obtained by recording a sound source with a first recording device, second learning audio data obtained by recording the sound source with a second recording device, and information on a recording device for obtaining the second learning audio data, and the second learning audio data is binaural audio data.

According to still another embodiment of the disclosure, a non-transitory computer readable medium storing computer instructions for causing an electronic apparatus to perform an operation when executed by a processor of the electronic apparatus where the operation includes inputting input audio data to an artificial intelligence model corresponding to user information, and obtaining output audio data from the artificial intelligence model, and the artificial intelligence model is a model learned based on first learning audio data obtained by recording a sound source with a first recording device, second learning audio data obtained by recording the sound source with a second recording device, and information on a recording device for obtaining the second learning audio data, and the second learning audio data is binaural audio data.

BRIEF DESCRIPTION OF DRAWINGS

The above and/or other aspects of the disclosure will be more apparent by describing certain embodiments of the present disclosure with reference to the accompanying drawings, in which.

DETAILED DESCRIPTION OF EXEMPLARY EMBODIMENTS

Figure 1:
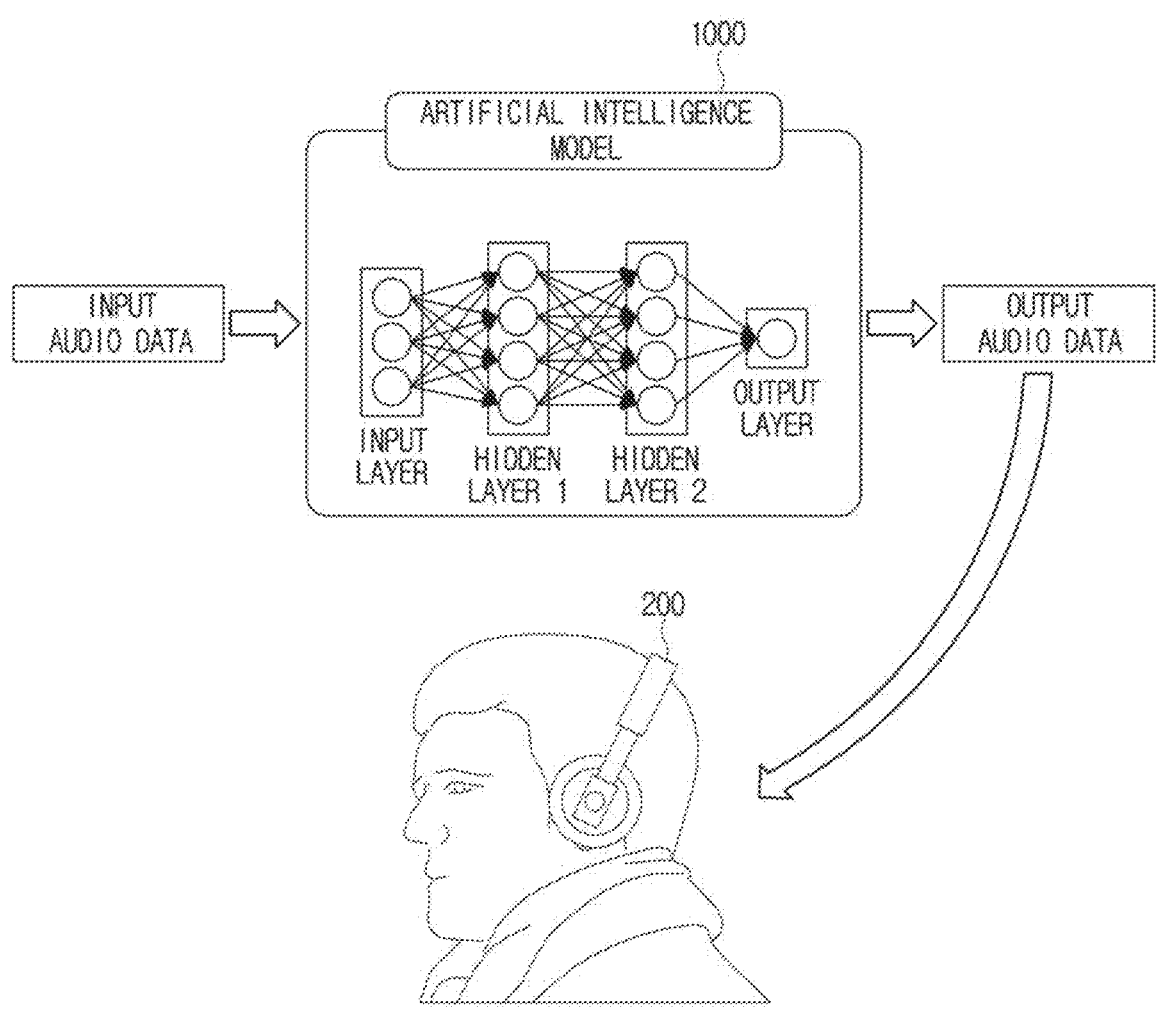
FIG. 1 is a diagram for describing an artificial intelligence model for converting audio data.

The disclosure provides an electronic apparatus using an artificial intelligence model corresponding to user information by obtaining the user information through a camera in converting a sound signal, and a controlling method thereof.

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates an existence of a corresponding feature (for example, a numerical value, a function, an operation, a component such as a part, or the like), and does not exclude an existence of an additional feature.

The expression "at least one of A and/or B" should be understood to represent either "A" or "B" or any one of "A and B".

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component).

Singular expressions include plural expressions unless the context clearly indicates otherwise. It should be further understood that the term "include" or "constituted" used in the application specify the presence of features, numerals, steps, operations, components, parts mentioned in the specification, or combinations thereof, but do not preclude the presence or addition of one or more other features, numerals, steps, operations, components, parts, or combinations thereof.

In the disclosure, a 'module' or a '~er/~or' may perform at least one function or operation, and be implemented by hardware or software or be implemented by a combination of hardware and software. In addition, a plurality of 'modules' or a plurality of '~ers/ors' may be integrated in at least one module and be implemented as at least one processor (not illustrated) except for a 'module' or an '~er/or' that needs to be implemented by specific hardware.

In the disclosure, a term "user" may be a person that uses the electronic apparatus or an apparatus (e.g., an artificial intelligence electronic apparatus) that uses the electronic apparatus.

Hereinafter, an embodiment of the disclosure will be described in more detail with reference to the accompanying drawings.

FIG. 1 is a diagram for describing an artificial intelligence model for converting audio data.

Referring to FIG. 1, an artificial intelligence model 1000 may be a model for converting audio data. According to an embodiment, the converting of the audio data may mean converting a low quality audio signal into a high quality audio signal. According to another embodiment, the converting of the audio data may mean converting mono audio data into stereo audio data. According to still another embodiment, the converting of the audio data may mean converting the audio data into audio data similar to binaural audio data. Here, the binaural audio data may mean audio data recorded through a binaural microphone. The binaural microphone will be described in detail below with reference to FIG. 2.

Meanwhile, an operation of converting the audio data into the audio data similar to the binaural audio data (hereinafter, referred to as binaural audio data) may mean a binaural rendering. The binaural rendering may mean converting an audio signal so that even normal audio data not recorded by the binaural microphone is recognized as if recorded by the binaural microphone. The artificial intelligence model 1000 may receive input audio data and perform the binaural rendering such that the input audio data becomes audio data similar to the binaural audio data. In addition, the audio data rendered or converted by the artificial intelligence model 1000 may be represented as output audio data of the artificial intelligence model 1000.

Here, the artificial intelligence model 1000 may be a model learned to perform the binaural rendering operation. The artificial intelligence model 1000 may be a model learned based on the normal audio data recorded by a general microphone and the binaural audio data recorded by the binaural microphone reflecting the normal audio data, and a detailed learning process will be described later with reference to FIG. 2. Here, the correspondence of the binaural audio data to the normal audio data may mean that the normal audio data and the binaural audio data are recorded from the same sound source (e.g., the same sound source from the same environment, or the sound source from the same environment at the same time).

Meanwhile, the output audio data output by the artificial intelligence model 1000 may be provided to a user through a sound output device 200. When the output audio data is output by the sound output device 200, the user may listen to the binaural audio data (binaural audio signal). Here, the sound output device 200 may include at least two speakers or sound output driver units. The binaural audio data may include a left signal and a right signal, and the sound output device 200 may include a plurality of speakers or sound output driver units capable of outputting the left signal and the right signal, respectively, to output the binaural audio data.

Here, the sound output device 200 according to an embodiment may refer to various kinds of speakers in contact with a body of the user. For example, the sound output device 200 may refer to earphones (wired or wireless) and headphones (wired or wireless). Here, the earphone and the headphone are merely one example, and the output audio data may be output through various speakers.

Meanwhile, the sound output device 200 according to another embodiment may refer to various kinds of speakers that are not in contact with the body of the user. For example, the sound output device 200 may refer to a speaker including a plurality of channels (two or more channels). However, because the artificial intelligence model 1000 is learned using the binaural audio data, the sound output device 200 that is not in contact with the body of the user may require additional signal processing operations in addition to the binaural rendering.

Figure 2:
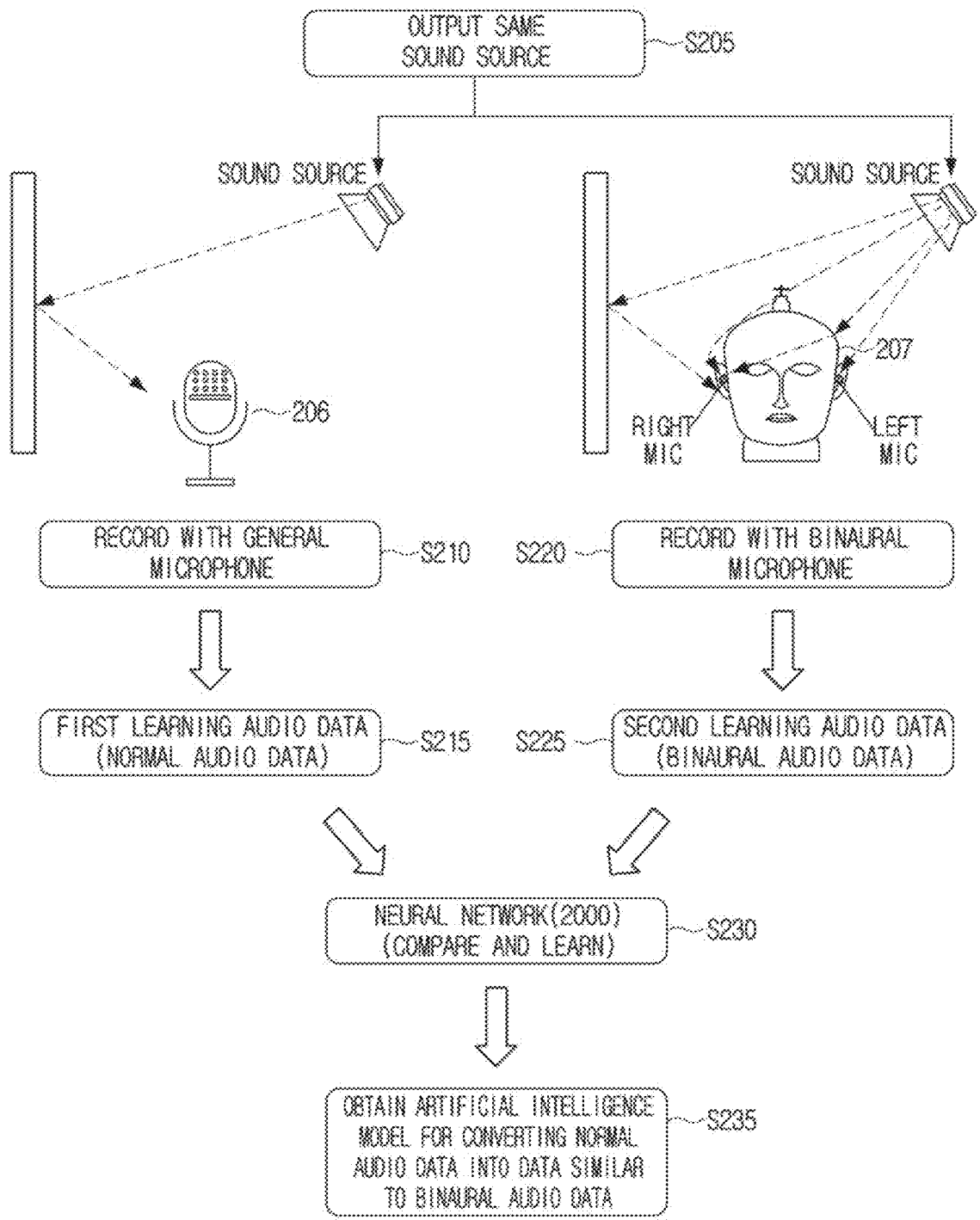
FIG. 2 is a diagram for describing a neural network that learns based on audio data recorded using a general microphone and a binaural microphone.

FIG. 2 is a diagram for describing a neural network that learns based on audio data recorded using a general microphone and a binaural microphone.

The artificial intelligence model 1000 described with reference to FIG. 1 may refer to a model that performs the binaural rendering based on the input audio data, and a neural network 2000 may perform a separate learning operation to obtain the artificial intelligence model 1000 that performs the binaural rendering.

Referring to FIG. 2, the neural network 2000 may use a learning method according to machine learning including deep learning. Specifically, the neural network 2000 may receive normal data and reference data in advance, and learn a relationship between the normal data and the reference data. Here, the normal data and the reference data may refer to data to be learned as one sample data. The normal data may refer to input data of the artificial intelligence model 1000, and the reference data may refer to target data or objective data of the artificial intelligence model 1000. The neural network 2000 may generate an artificial intelligence model that learns the normal data and the reference data, converts the normal data, and generates audio data similar to the reference data.

The neural network 2000 according to an embodiment of the disclosure may learn based on sample data. Here, the sample data may be at least one recording data recorded through different microphones while the same sound source is output. According to an embodiment, the same sound source may be simultaneously recorded through different microphones while the same sound source is output. Specifically, a sound source may be output in order to obtain sample data (S205). Here, outputting the sound source may mean outputting a sound signal in an audible frequency range. For example, the sound source output operation may refer to an act of directly speaking by a person, an act of directly making a sound using a tool by a person, including playing, and an act of outputting recorded audio data through a speaker. Meanwhile, in addition to the sound source output operation, a natural sound may be recorded as it is and used as the sample data.

In addition, a general microphone 206 may record the sound source output in S205 (S210). The general microphone may refer to a microphone having at least one microphone. The general microphone 206 may refer to a microphone that is not a binaural microphone. The general microphone 206 may obtain normal audio data based on the sound source signal recorded in S210 (S215). Here, the normal audio data may be first learning audio data e.g., normal data.

The binaural microphone 207 may record the sound source output in S205 (S220). Here, the sound source received by the general microphone 206 and the binaural microphone 207 may be the same.

The binaural microphone 207 may refer to various types of recording devices used to obtain the binaural audio data.

According to an embodiment, the binaural microphone 207 may refer to a recording device including a microphone attached to an ear part in a model (hereinafter, referred to as a human body model) having a human head shape or a shape in which a chest is coupled to a head. The model having the human head shape or the shape in which the chest is coupled to the head may be a dummy head. In addition, the dummy head may include a left ear model and a right ear model, and a left microphone and a right microphone may be disposed in the left ear model and the right ear model, respectively. Specifically, the left microphone may be attached to a left external auditory meatus or left eardrum of the human body model, and the right microphone may be attached to a right external auditory meatus or right eardrum of the human body model. The recording device including the dummy head, the left microphone, and the right microphone may also be referred to as a dummy head microphone.

According to another embodiment, the binaural microphone 207 may be implemented in a form without the dummy head. For example, the binaural microphone 207 may include dummy ear without the dummy head, and may include a microphone in the dummy ear.

The binaural microphone 207 may obtain audio data similar to a sound actually heard by a human. The human hears the sound through the head, auricles, and external auditory meatus. By using a recording device including a model similar to a human body structure, audio data similar to the sound actually heard by human may be obtained.

The binaural microphone 207 may obtain binaural audio data including left audio data and right audio data based on the sound source signal recorded in S220 (S225). Here, the obtained binaural audio data may be second learning audio data (e.g., reference data).

The neural network 2000 may compare and learn the normal audio data (e.g., first learning audio data) and the binaural audio data (e.g., second learning audio data) (S230). Specifically, the neural network 2000 may perform a machine learning operation by analyzing a relationship between the normal audio data and the binaural audio data. In addition, the neural network 2000 may finally obtain the artificial intelligence model 1000 for converting the normal audio data into audio data similar to the binaural audio data (S235). Here, converting the normal audio data into the audio data similar to the binaural audio data may mean performing the binaural rendering.

Meanwhile, the general microphone 206 and the binaural microphone 207 may perform the recording at the same time to obtain the audio data.

A detailed example of a process of learning the artificial intelligence model 1000 will be described later with reference to FIGS. 6 and 21 to 28.

Figure 3:
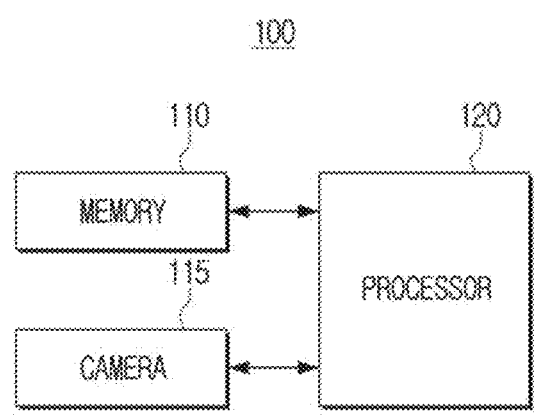
FIG. 3 is a block diagram of an electronic apparatus according to an embodiment of the disclosure.

FIG. 3 is a block diagram of an electronic apparatus according to an embodiment of the disclosure.

Referring to FIG. 3, an electronic apparatus 100 may include a memory 110, a camera 115, and a processor 120.

The electronic apparatus 100 according to diverse embodiments of the disclosure may include at least one of, for example, a smartphone, a tablet personal computer (PC), a mobile phone, an image phone, a desktop personal computer (PC), a laptop personal computer (PC), a netbook computer, a workstation, a server, a personal digital assistant (PDA), a portable multimedia player (PMP), an MP3 player, a camera, or a wearable device. The wearable device may include at least one of an accessory type wearable device (for example, a watch, a ring, a bracelet, an anklet, a necklace, a glasses, a contact lens, or a head-mounted-device (HMD)), a textile or clothing integral type wearable device (for example, an electronic clothing), a body attachment type wearable device (for example, a skin pad or a tattoo), or a bio-implantable circuit. In some embodiments, the electronic apparatus 100 may include at least one of, for example, a television, a digital video disk (DVD) player, or an audio.

The memory 110 may be implemented as an internal memory such as a ROM (e.g., electrically erasable programmable read-only memory (EEPROM)) or a RAM included in the processor 120, or be implemented as a memory separate from the processor 120. In this case, the memory 110 may be implemented in a form of a memory embedded in the electronic apparatus 100 or a form of a memory attachable to and detachable from the electronic apparatus 100 depending on a data storing purpose. For example, data for driving the electronic apparatus 100 may be stored in the memory embedded in the electronic apparatus 100, and data for extended function of the electronic apparatus 100 may be stored in the memory attachable to and detachable from the electronic apparatus 100.

The memory 110 may store at least one instruction. Here, the instruction may refer to at least one of a user's command, a user's operation, or a preset event.

The memory 110 according to an embodiment of the disclosure may store the artificial intelligence model 1000. When a control command for converting the audio data is identified, the electronic apparatus 100 may convert the audio data using the artificial intelligence model 1000 stored in the memory 110. Meanwhile, the artificial intelligence model 1000 is not necessarily stored in the memory 110 of the electronic apparatus 100, and the artificial intelligence model 1000 may be implemented in a form that is stored in an external server.

Meanwhile, the memory embedded in the electronic apparatus 100 may be implemented as at least one of a volatile memory (e.g., a dynamic random access memory (DRAM), a static RAM (SRAM), a synchronous dynamic RAM (SDRAM), or the like), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)), and the memory attachable to and detachable from the electronic apparatus 100 may be implemented in the form such as a memory card (e.g., a compact flash (CF), a secure digital (SD), a micro secure digital (Micro-SD), a mini secure digital (Mini-SD), an extreme digital (xD), a multi-media card (MMC), or the like), an external memory (e.g., a USB memory) connectable to a USB port, or the like.

The camera 115 may be an optical device for capturing a subject, and may use visible light. The camera 115 may include a light collecting part (e.g., lens) that receives light, and an imaging part in which an image formed by the light received by the light collecting part is formed. In addition, the camera 115 may further include a shutter, an aperture, a flash, and the like as necessary.

The electronic apparatus 100 according to an embodiment of the disclosure may obtain an image including a face of the user through the camera 115. In addition, the electronic apparatus 100 may obtain user information by analyzing the obtained image. The user information may refer to user body information and user identification information.

The processor 120 may perform an overall control operation of the electronic apparatus 100. Specifically, the processor 120 functions to control an overall operation of the electronic apparatus 100.

The processor 120 may be implemented as a digital signal processor (DSP), a microprocessor, or a time controller (TCON) that processes a digital signal. However, the processor 120 is not limited thereto, but may include one or more of a central processing unit (CPU), a micro controller unit (MCU), a micro processing unit (MPU), a controller, an application processor (AP), a graphics-processing unit (GPU), a communication processor (CP), and an ARM processor, or may be defined as the corresponding term. In addition, the processor 120 may also be implemented as a system-on-chip (SoC) or a large scale integration (LSI) in which a processing algorithm is embedded, and may also be implemented in the form of a field programmable gate array (FPGA). In addition, the processor 120 may perform various functions by executing computer executable instructions stored in the memory 110.

The processor 120 may obtain user information based on at least one of a user image obtained through the camera 115 or information separately input by the user by executing the instruction. Here, the user image may refer to an image including a user's appearance. In addition, the user information may include at least one of user body information or user identification information. The user body information may include at least one of a user head size, a user head shape, a user head circumference, a position of the user's ear, a user ear shape (a shape of the user's ear), or a user ear size, and the user identification information may include at least one of user gender, user age, or user hearing.

According to an embodiment, the processor 120 may obtain the user body information such as a user head size or the user identification information such as a user gender, based on the user image. According to another embodiment, the processor 120 may receive at least one of the user body information or the user identification information as separate data. Receiving the information as the separate data may mean that the user directly inputs the user information.

The processor 120 may store the obtained user information in the memory 110, and the artificial intelligence model 1000 may use the user information stored in the memory 110.

The processor 120 may input audio data to the artificial intelligence model 1000 corresponding to the user information. The artificial intelligence model 1000 corresponding to the user information may refer to an artificial intelligence model suitable for a user. The processor 120 may identify the artificial intelligence model corresponding to the user information and input the input audio data into the identified artificial intelligence model.

According to an embodiment, the number of artificial intelligence models stored in the memory 110 may be plural. The processor 120 may identify one artificial intelligence model 1000 suitable for the user among a plurality of artificial intelligence models based on the user information. For example, it is assumed that an A artificial intelligence model corresponding to a head size of 10 cm, a B artificial intelligence model corresponding to a head size of 20 cm, and a C artificial intelligence model corresponding to a head size of 30 cm are stored in the memory 110. If the head size of the user obtained by the camera is identified as 20 cm, the processor 120 may identify the B artificial intelligence model.

Here, the artificial intelligence model that perfectly corresponds to the user information may not be identified. In this case, the processor 120 may use an artificial intelligence model that is most suitable for the user information, or may partially change the artificial intelligence models stored in the memory 110 based on the user information. In the embodiment of partially changing the artificial intelligence models, when only one artificial intelligence model is stored in the memory 110, the processor 120 may modify a parameter of an existing artificial intelligence model based on the user information.

According to another embodiment, the artificial intelligence model 1000 may include a plurality of parameters. At least one parameter of the plurality of parameters may be a parameter related to the user information. In addition, the processor 120 may determine a setting value of the parameter related to the user information based on the obtained user information. For example, when the head size of the user obtained by the camera is identified as 20 cm, the processor 120 may determine the setting value of the parameter related to the user information as a value 20 corresponding to 20 cm.

Meanwhile, a detailed description of obtaining the user image through the camera will be described later with reference to FIG. 5.

Meanwhile, in the specification, an example of identifying one artificial intelligence model corresponding to the user information among the plurality of artificial intelligence models is described. However, according to an implementation example, all operations described in the specification may be implemented as an example of identifying a parameter value corresponding to the user information among a plurality of parameter values.

The processor 120 may input the input audio data into the artificial intelligence model 1000, and the artificial intelligence model 1000 may perform binaural rendering based on the received input audio data and the obtained user information. In addition, the artificial intelligence model 1000 may generate output audio data as a result of performing the binaural rendering. The processor 120 may include a processor for obtaining the output audio data from the artificial intelligence model 1000. In addition, an operation in which the artificial intelligence model 1000 performs the binaural rendering based on the user information will be described in detail later with reference to FIG. 7.

Meanwhile, the artificial intelligence model 1000 is a model learned based on first learning audio data recording a sound source with a first recording device, second learning audio data recording the sound source with a second recording device, and information on a recording device for obtaining the second learning audio data, and the second learning audio data is binaural audio data. Here, the first recording device may refer to a recording device including the general microphone. In addition, the second recording device may refer to a recording device including the binaural microphone. The first recording device and the second recording device may record the same sound source. In FIG. 2, a detailed operation has been described, and 206 of FIG. 2 may be the first recording device and 207 of FIG. 2 may correspond to the second recording device.

Here, the second learning audio data corresponding to the first learning audio data may mean that the first learning audio data and the second learning audio data are audio data obtained by recording the same sound source. For example, the first learning audio data may be audio data obtained by recording an 'A' sound source with the general microphone instead of the binaural microphone. In addition, the second learning audio data may be audio data obtained by recording the 'A' sound source through the binaural microphone.

Here, the information on the recording device for obtaining the second learning audio data may refer to a binaural recording device. The binaural recording device may refer to the binaural microphone 207 described with reference to FIG. 2. The binaural microphone 207 does not include a microphone itself that simply obtains sound, but may further include a dummy model that shapes a part of the human body. Specifically, the recording device (e.g., binaural recording device or binaural microphone) for obtaining the second learning audio data may include at least one of a human head model, a human ear model, or a plurality of microphones, and the information on the recording device for obtaining the second learning audio data may include information on at least one of a human head model size, a human head model shape, a human ear model size, or a human ear model shape.

A learning process for obtaining the artificial intelligence model 1000 will be described with reference to FIGS. 2 and 6. In addition, a detailed calculation process for learning the artificial intelligence model 1000 will be described later with reference to FIGS. 21 to 28.

Meanwhile, the processor 120 may identify whether an external sound output device is connected to an outputter. Here, the outputter may refer to a configuration for outputting an audio signal to the external sound output device, and the outputter may be a partial chip of a communication interface or an input and output interface. According to an embodiment, if the external sound output device is a device that performs communication by a wired manner, the outputter may refer to a sound terminal or a sound jack. According to another embodiment, if the external sound output device is a device that performs communication by a wireless manner, the outputter may refer to a communication interface that transmits a wireless communication signal.

When the processor 120 identifies that the sound output device is not connected to the electronic apparatus 100, the processor 120 may control a display to display a guide UI for guiding a connection of the sound output device. When the external sound output device is not connected to the electronic apparatus 100, reproducing the output audio data output by the artificial intelligence model 1000 may be less meaningful in terms of binaural effects. The external sound output device may be required for the user to listen to the binaural effects included in the output audio data. Therefore, when the external sound output device is not connected to the electronic apparatus 100, the processor 120 may generate a guide UI for guiding a user to connect an external sound output device and display the guide UI on the display. A detailed description related to the guide UI will be described later with reference to FIG. 15.

On the other hand, the external sound output device according to an embodiment may be a sound output device used in contact with the user body. The sound output device used in contact with the user body may be at least one of earphones or headphones. The binaural effect may refer to an effect that makes the audio signal feel as if the sound is being heard in the field, not the recording sound. The binaural effect may be provided by the binaural audio data recorded through the binaural recording device (e.g., binaural microphone) or the output audio data binaural-rendered by the artificial intelligence model 1000. The binaural effect may be felt higher in the sound output device such as the earphone or the headphone that is in contact with the user body, particularly, the ear.

However, a sound output device used without being in contact with the user body may output the output audio data output by the artificial intelligence model 1000. Because the artificial intelligence model 1000 is a model learned on the assumption that the artificial intelligence model 1000 is used in contact with the user body, the binaural effect may be lowered when the sound output device used without being in contact with the user body generates the output audio data.

Therefore, the processor 120 identifies the type of the external sound output device, and if the sound output device is identified as a sound output device used without being in contact with the user body, the processor 120 may convert the output audio data into an audio signal corresponding to the identified sound output device. Alternatively, the output audio data may be converted and output in advance by a separate artificial intelligence model learned on the assumption that the artificial intelligence model is used without being in contact with the user body. The audio signal corresponding to the identified sound output device may mean converting the audio signal so that the binaural effect is naturally output even from the sound output device used without being in contact with the user body other than the earphone or the headphone.

Meanwhile, the processor 120 may obtain at least one of context information of the electronic apparatus 100 or information on a space where the user is located. Here, the context information of the electronic apparatus 100 may include at least one of information on an application executed in the electronic apparatus 100 or audio volume information set in the electronic apparatus 100.

The processor 120 may input the input audio data to the artificial intelligence model 1000 corresponding to at least one of the context information of the electronic apparatus 100, the information on the space where the user is located, or information on a space desired by the user. The artificial intelligence model 1000 corresponding to at least one of the context information of the electronic apparatus 100, the information on the space where the user is located, or the information on the space desired by the user may refer to an artificial intelligence model capable of generating the output audio data most suitable for the user based on the information obtained by the processor 120.

According to an embodiment, the processor 120 may identify the artificial intelligence model 1000 in consideration of the application executed in the electronic apparatus 100. For example, when a call application is currently executed in the electronic apparatus 100, the processor 120 may identify an artificial intelligence model corresponding to the call application among a plurality of artificial intelligence models related to the call.

Meanwhile, an embodiment of using the information on the space where the user is located or the information on the space desired by the user will be described later with reference to FIG. 8. In addition, an embodiment of using the context information (e.g., information on the application which is executed) will be described later with reference to FIG. 9.

In addition, the audio volume information may refer to information related to output intensity of the audio signal output from the electronic apparatus 100 or information related to the output intensity of the audio signal output from the external sound output device 200 (information is stored in the electronic apparatus 100). For example, it is assumed that the output intensity of the audio signal is at least 0 to at most 100. It is assumed that current intensity of the audio signal output from the electronic apparatus 100 is 50. The artificial intelligence model 1000 may reflect that the output intensity of the audio signal is 50 while performing the binaural rendering. That is, the artificial intelligence model 1000 may generate the output audio data differently according to the output intensity of the audio signal. The artificial intelligence model 1000 may generate the output audio data with output magnitude suitable for the user without the user adjusting the output magnitude. When the artificial intelligence model 1000 generates the output audio data in consideration of the output magnitude, the user may listen to the output audio data with appropriate magnitude regardless of the output magnitude set in the electronic apparatus 100.

Meanwhile, the artificial intelligence model 1000 that generates the output audio data based on the context information or the information on the space where the user is located may be a model learned based on at least one of the context information of the electronic apparatus 100 or the information on the space where the user is located, the first learning audio data, the second learning audio data, and information on the recording device for obtaining the second learning audio data.

Meanwhile, based on the application executed in the electronic apparatus 100 being an audio related application, the processor 120 may control the display to display a UI that inquires whether to obtain the output audio data from the artificial intelligence model 1000. Here, the audio related application may refer to an application having a function of outputting the audio signal from the electronic apparatus 100 as a main function. The audio related application having the function of outputting the audio signal as the main function may mean that one of the main purposes of the application is an output of the audio signal. For example, a music execution application, a call application, a game application, a TV viewing application, a video streaming application, and the like may be the audio related application whose main purpose is to output the audio signal. However, an alarm application, a finance related application, a schedule application, a purchase application, and the like may not be the audio related application. The audio related application may be automatically determined by a predetermined criterion or determined by an input of the user. Meanwhile, the audio related application is not limited to the above examples, and there may be various applications that output the audio signal.

The processor 120 may identify whether or not an application currently executed by the electronic apparatus 100 includes the function of outputting the audio signal. In addition, if the application currently executed by the electronic apparatus 100 is identified as including the function for outputting the audio signal, the processor 120 may control the display to display a UI that inquires whether to perform the binaural rendering on the display. When the processor 120 receives a control command for performing the binaural rendering from the user, the processor 120 may perform the binaural rendering to output the audio signal.

In addition, when the user receives a control command for performing the binaural rendering from an application A, the processor 120 may additionally display a UI displaying whether to perform the binaural rendering on a screen of the application A. The UI displaying whether to perform the binaural rendering may be displayed while the audio signal is output. In addition, the UI displaying whether to perform the binaural rendering may be continuously displayed while the audio signal is not output, but the application A is performed.

In addition, the processor 120 may receive a setting value of the user through a sound setting screen. The sound setting screen may include a setting regarding a function of displaying a UI for inquiring whether to perform the binaural rendering when the audio related application is executed in the electronic apparatus 100.

Meanwhile, the sound setting screen may include a setting regarding a function for performing the binaural rendering in all applications related to the audio signal. Here, all applications related to the audio signal may refer to all applications including the function of outputting the audio signal. When the processor 120 receives a control command for performing the binaural rendering in all applications related to the audio signal through the sound setting screen, the processor 120 may perform the binaural rendering in all applications without a separate user input.

The UI related to the binaural rendering and the content related to the setting screen will be described later in detail with reference to FIGS. 16 to 19.

In addition, the artificial intelligence model 1000 is a model learned based on the first learning audio data, the second learning audio data, the information on the recording device for obtaining the second learning audio data, and information on a recording situation of the first learning audio data and the second learning audio data, and the information on the recording situation may include at least one of sound source distance information (or recording distance information) or recording space information.

Here, the information on the recording situation may refer to information related to the learning data used in a learning process. The neural network 2000 may learn the artificial intelligence model 1000 using general audio data (e.g., first learning audio data) and binaural audio data (e.g., second learning audio data) recorded with the same sound source.

Here, the sound source distance information may refer to distance information between a position where the sound source is output and a position where the microphone is installed. When the neural network 2000 additionally learns in consideration of the sound source distance information, it is possible to analyze how the audio signal listened to by the user varies depending on the sound source distance. In addition, when the artificial intelligence model 1000 generates the output audio data in consideration of the sound source distance, the artificial intelligence model 1000 may generate the output audio data based on the sound source distance based on the learned result.

In addition, the recording space information may refer to a space to which the sound source is output or in which a natural sound to be recorded is generated and recorded. When the neural network 2000 additionally learns in consideration of the recording space information, it is possible to analyze how the audio signal listened to by the user varies depending on the recording space. In addition, when the artificial intelligence model 1000 generates the output audio data in consideration of the recording space, the artificial intelligence model 1000 may generate the output audio data based on the recording space based on the learned result.

Meanwhile, based on the application executed in the electronic apparatus 100 being an application related to a virtual space, the processor 120 may obtain virtual space content including sound source information and space information. Here, the sound source information of the virtual space content may include information on how far audio data output from the virtual space is output from a distance of some extent. In addition, the space information of the virtual space content may refer to at least one of place information (indoor, outdoor, or a specific place) or space complexity information of the virtual space. In addition, the processor 120 may input the input audio data to an artificial intelligence model corresponding to the obtained virtual space content. Specifically, the processor 120 may input the input audio data into an artificial intelligence model that is most suitable and corresponds to the virtual content based on the sound source information or the space information included in the virtual space content.

Meanwhile, the processor 120 may receive input video data together with the input audio data. Here, the input video data may correspond to the input audio data and may be data synchronized based on time information. When the processor 120 receives the input video data, the processor 120 may obtain space information of the input video data by analyzing image information included in the input video data. Here, the space information of the input video data may include at least one of place information or space complexity information included in the input video data. Here, the space complexity information may refer to information quantifying how many people are in the space. For example, it is assumed that the input video data corresponding to the input audio data includes a performance hall image and an image having 100 people in the performance hall. The processor 120 may identify the artificial intelligence model 1000 capable of performing the binaural rendering suitable for the performance hall or performing the binaural rendering in consideration of a shout sound of 100 spectators.

In addition, a detailed process for learning the artificial intelligence model 1000 will be described later with reference to FIG. 6.

Meanwhile, the neural network 2000 in which the artificial intelligence model 1000 is learned may include a plurality of layers, receive the first learning audio data (e.g., normal audio data), and output expected audio data in a time domain based on the calculation through the plurality of layers. Parameters used in the plurality of layers may be learned based on a cost function for comparing the expected audio data output in the time domain and the second learning audio data (e.g., binaural audio data) corresponding to the first learning audio data in a frequency domain, respectively. Here, the cost function may refer to a function that quantifies a difference or error between predicted data (e.g., second learning data, binaural audio data) and expected data (e.g., expected audio data, calculation data, calculated data, calculation audio data, calculated audio data or prediction audio data (with reference to expression of FIGS. 21 to 25)). The cost function of the artificial intelligence model may be called a loss function. The artificial intelligence model may obtain a loss value based on the cost function or the loss function. Here, the loss value may refer to a value related to a difference value between the predicted data (e.g., binaural audio data) and the expected data (e.g., calculation data). The purpose of the cost function may be to have parameters that minimize cost, loss, error, and the like. In addition, the purpose of the cost function may be to have a parameter whose desired result value is the maximum. Here, the cost function may user a gradient descent algorithm.

On the other hand, according to another embodiment, the cost function and the loss function may be used as separate concepts. Specifically, the loss function may calculate a difference value between the predicted data (e.g. binaural audio data) (single data) and the expected data (e.g., calculation data) (single data), and the cost function may calculate a sum or average of a plurality of difference values obtained by the loss function. The loss value referred to herein may refer to a value related to a single data set, and may refer to a sum or average of values related to an entire data set in some cases.

Meanwhile, if the expected audio data (e.g., calculation data) based on the calculation is output in the frequency domain, the artificial intelligence model may also be learned based on the loss value obtained by comparing the expected audio data (e.g., calculation data) and the second learning audio data corresponding to the first learning audio data in the time domain.

Here, the first learning audio data may be the normal audio data and the second learning audio data may be the binaural audio data.

If the input of the learning data, the generation of the learning data (e.g., expected audio data) and the calculation of the loss value are all performed in the time domain, learning about the artificial intelligence model may not be performed properly because the learning operation is near random. In order to solve such a problem, the input of the learning data, the generation of the learning data (e.g., expected audio data) and the calculation of the loss value may be all performed in the frequency domain. However, when all the operations are performed in the frequency domain, an accuracy of phase information may be lowered, such that the learning about the artificial intelligence model may not be performed properly.

Therefore, the neural network 2000 according to an embodiment of the disclosure may generate the expected audio data (e.g., calculation data) generated in the learning process in the time domain, and perform the calculation of the loss value in the frequency domain. The neural network 2000 may use the frequency domain only when calculating the loss value, transform the input audio data in the time domain (including transformation according to back propagation), and learn the artificial intelligence model 1000. The neural network 2000 may generate the artificial intelligence model 1000 having high performance because the neural network 2000 considers the phase information in the time domain and performs a simplified calculation of the loss value in the frequency domain. Here, when the neural network 2000 restricts or emphasizes a specific frequency band in an operation of performing the calculation of the loss value, a simplification operation may be added to generate the artificial intelligence model 1000 having better performance. Here, the specific frequency band may be 0 to 22 kHz. However, the specific frequency band may vary depending on the setting of the user.

Meanwhile, if the expected audio data (e.g., calculation data) is output in the frequency domain, the parameter may be learned based on the cost function of comparing the expected audio data (e.g., calculation data) output in the frequency domain and the second learning audio data corresponding to the first learning audio data in the time domain.

Here, the cost function may refer to cost calculation, and the loss value may use at least one of a first loss value obtained based on signal intensity of the expected audio data and signal intensity of the second learning audio data, a second loss value obtained based on intensity for each frequency of the expected audio data and intensity for each frequency of the second learning audio data, or a third loss value obtained based on noise information of the expected audio data and noise information of the second learning audio data.

Here, a first weight applied to a difference between a first frequency intensity of the expected audio data and a first frequency intensity of the second learning audio data may be different from a second weight applied to a difference between a second frequency intensity of the expected audio data and a second frequency intensity of the second learning audio data.

Meanwhile, the loss value may be obtained through a network (e.g., second network) separate from a network (e.g., first network) that generates the expected audio data, and the separate network (e.g., second network) may learn to compare the expected audio data and the second learning audio data in the frequency domain to obtain the loss value.

In addition, the parameters used in the plurality of layers may be learned based on loss values obtained by comparing data of the remaining frequency band except the specific frequency band in the expected audio data and data of the remaining frequency band except the specific frequency band in the second learning audio data. Details thereof will be described later with reference to FIG. 23.

Here, the neural network may output intermediate expected audio data corresponding to the first learning audio data (e.g., normal audio data) in the time domain in at least one intermediate layer of the plurality of layers. In addition, the parameters used in the plurality of layers may be learned based on a first loss value obtained by comparing the expected audio data and the second learning audio data in the frequency domain, and a second loss value obtained by comparing the intermediate expected audio data and the second learning audio data in the frequency domain. Details thereof will be described later with reference to FIG. 24.

Meanwhile, the first loss value may be obtained based on a difference value between an average intensity of all frequency signals corresponding to a specific frame of the expected audio data and an average intensity of all frequency signals corresponding to a specific frame of the second learning audio data. Details thereof will be described later with reference to FIG. 28.

Meanwhile, the parameters used in the plurality of layers may be learned based on a discrimination value obtained by comparing fake audio data and the second learning audio data (e.g., real audio data) in the frequency domain. Here, the discrimination value may be a degree indicating whether or not the fake audio data is the same as the second learning audio data. Here, the fake audio data may be the same as the expected audio data or data converted based on the expected audio data. In addition, the fake audio data or the discrimination value may be obtained by a generative adversarial network (GAN) model. Details thereof will be described later with reference to FIG. 25.

The neural network 2000 may receive the general audio data and the binaural audio data in the time domain. In addition, the neural network 2000 may learn a conversion relationship between the general audio data and the binaural audio data using a deep neural network (DNN) in the time domain. The neural network 2000 may perform the calculation of the loss value of the expected audio data and the binaural audio data generated based on the normal audio data in the frequency domain. In addition, the neural network 2000 may perform the back propagation operation in a direction in which the loss value is low based on the obtained loss value. Specifically, the neural network 2000 may learn by modifying the weight so that the loss value is low, and repeatedly performing the calculation of the loss value and the back propagation operation. The neural network 2000 may finally determine the weight with the lowest loss value and generate the final artificial intelligence model 1000.

Meanwhile, a detailed learning operation of the artificial intelligence model 1000 related to the expected audio data and the loss value will be described later with reference to FIGS. 21 to 29.

Meanwhile, the electronic apparatus 100 according to an embodiment of the disclosure may perform the binaural rendering using the artificial intelligence model 1000. Here, the electronic apparatus 100 may identify the artificial intelligence model 1000 suitable for the user in consideration of user information. If the artificial intelligence model 1000 corresponding to the user information is identified, the binaural rendering may be performed by the artificial intelligence model 1000 suitable for user information. In order to generate the artificial intelligence model 1000 suitable for user information, the neural network 2000 may learn the artificial intelligence model 1000 in consideration of the user information.

In addition, the neural network 2000 may perform the operation of receiving the learning data, the operation of generating the expected data, and the back propagation operation in the time domain and perform the calculation of the loss value in the frequency domain in order to generate the artificial intelligence model 1000 having high performance. Because the phase information is considered in the time domain and the simplified calculation of the loss value is performed in the frequency domain, an artificial intelligence model 1000 having higher performance than a model performing all operations in the frequency domain or a model learning all operations in the time domain may be generated.

Meanwhile, hereinabove, only a simple configuration of the electronic apparatus 100 is illustrated and described, but various configurations may be additionally provided at the time of implementation. This will be described below with reference to FIG. 4.

Figure 4:
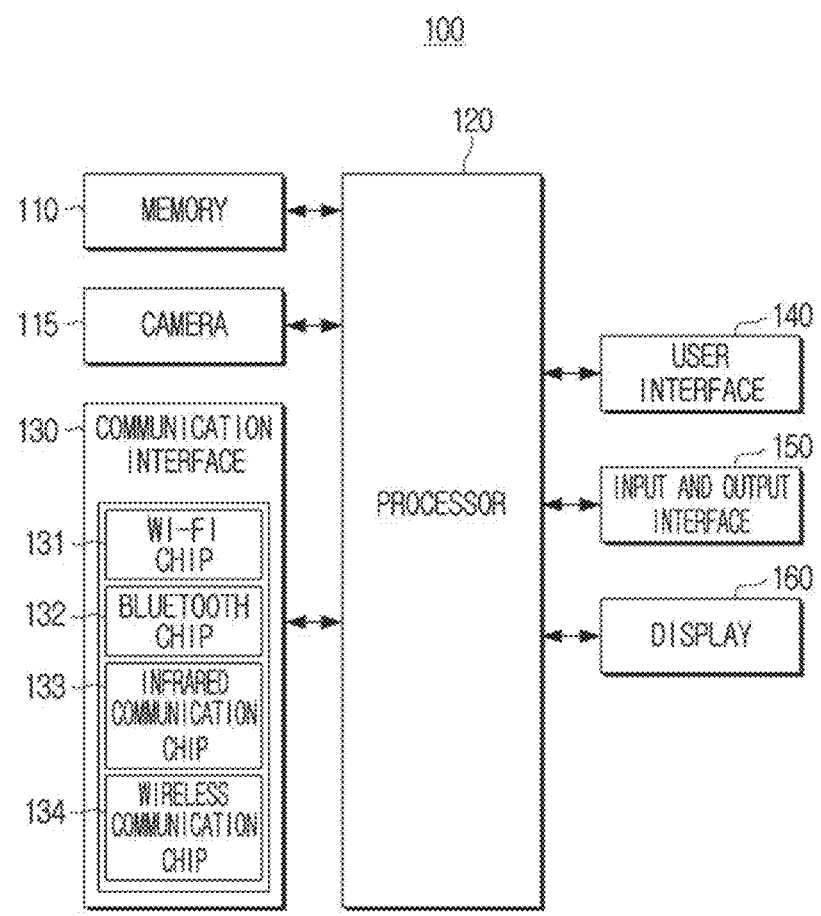
FIG. 4 is a detailed block diagram for describing a detailed configuration of the electronic apparatus of FIG. 3.

FIG. 4 is a detailed block diagram for describing a detailed configuration of the electronic apparatus of FIG. 3.

Referring to FIG. 4, the electronic apparatus 100 may include the memory 110, the camera 115, the processor 120, a communication interface 130, a user interface 140, an input and output interface 150, and a display 160.

Among these, the brief descriptions of the memory 110, the camera 115, and the processor 120 have been described with reference to FIG. 2, and thus duplicated descriptions will be omitted.

The processor 120 may control overall operations of the electronic apparatus 100 using various programs stored in the memory 110.

Meanwhile, the processor 120 may perform a graphics processing function (e.g., video processing function). For example, the processor 120 may generate a screen including various objects such as icons, images, texts, and the like by using a calculator (not illustrated) and a renderer (not illustrated). Here, the calculator (not illustrated) may calculate attribute values, such as coordinate values, shapes, sizes, and colors, to which each object is to be displayed according to a layout of a screen based on a received control command. In addition, the renderer (not illustrated) may generate screens of various layouts including the objects based on the attribute values calculated by the calculator (not illustrated). In addition, the processor 120 may perform various image processing such as decoding, scaling, noise filtering, frame rate conversion, resolution conversion, and the like on video data.

In addition, the processor 120 may perform processing on audio data. Specifically, the processor 120 may perform various processing such as decoding, amplification, noise filtering, or the like on the audio data.

Meanwhile, the processor 120 may have a separate portion for the graphics processing function (e.g., GPU).

The communication interface 130 may receive audio content including an audio signal. For example, the communication interface 130 may receive the audio content including the audio signal from an external device (e.g., a source device), an external storage medium (e.g., a USB), an external server (e.g., a web hard), or the like in a streaming or download manner through a communication manner such as AP-based Wi-Fi (Wireless LAN Network), Bluetooth, Zigbee, Wired/Wireless Local Area Network (LAN), Wide Area Network (WAN), Ethernet, IEEE 51394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like.

Here, the audio signal may be a digital audio signal. The digital audio signal may be generated by converting an analog signal into data, and the data may be defined to use a certain transmission format by a protocol. Meanwhile, the audio signal is not necessarily limited to the digital audio signal, but may be implemented as various types of audio signals.

The communication interface 130 is a component that performs communication with various types of external devices according to various types of communication manners. The communication interface 130 may include a Wi-Fi module 131, a Bluetooth module 132, an infrared communication module 133, a wireless communication module 134, and the like. Here, each communication module may be implemented in the form of at least one hardware chip, or the form of one hardware chip may serve as a plurality of communication modules.

The Wi-Fi module 131 and the Bluetooth (BT) module 132 perform communication in a Wi-Fi manner and a Bluetooth manner, respectively. In the case of using the Wi-Fi module 131 or the Bluetooth module 132, various kinds of connection information such as a service set identifier (SSID), a session key, and the like, are first transmitted and received, communication is connected using the connection information, and various kinds of information may then be transmitted and received.

The infrared communication module 133 performs communication according to an infrared data association (IrDA) technology that transmits data wirelessly at a short distance by using infrared rays between visible light and millimeter wave.

The wireless communication module 134 may include at least one communication chip that performs communication according to various wireless communication protocols such as Zigbee, 3rd generation (3G), 3rd generation partnership project (3GPP), Long Term Evolution (LTE), LTE Advanced (LET-A), 4th generation (4G), 5th generation (5G), and the like, in addition to the above-mentioned communication manners.

In addition, the communication interface 130 may include at least one of a local area network (LAN) module, an Ethernet module, or a wired communication module for performing communication using a pair cable, a coaxial cable, or an optical fiber cable.

According to one example, the communication interface 130 may use the same communication module (e.g., a Wi-Fi module) to communicate with an external device such as a remote controller and an external server.

According to another example, the communication interface 130 may use a different communication module (e.g., a Wi-Fi module) to communicate with an external device such as a remote controller and an external server. For example, the communication interface 130 may use at least one of the Ethernet module or the Wi-Fi module to communicate with the external server, and may use the BT module to communicate with the external device such as the remote controller. However, this is only an example and the communication interface 130 may use at least one communication module among various communication modules when communicating with a plurality of external devices or external servers.

Meanwhile, the electronic apparatus 100 may further include a tuner (not illustrated) and a demodulator (not illustrated) according to an implementation example.

The tuner (not illustrated) may receive a radio frequency (RF) broadcast signal by tuning a channel selected by a user or all previously stored channels among RF broadcast signals received through an antenna.

The demodulator (not illustrated) may receive and demodulate a digital IF signal (DIF) converted by the tuner and perform channel decoding.

The user interface 140 may be implemented as a device such as a button, a touch pad, a mouse, or a keyboard, or may be implemented as a touch screen that may also perform the display function described above and a manipulation/input function. Here, the button may be various types of buttons, such as mechanical buttons, touch pads, wheels, and the like, which are formed in arbitrary areas such as a front portion, a side portion, and a back portion of a main body exterior of the electronic apparatus 100.

The input and output interface 150 may be any one interface of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), and a digital visual interface (DVI).

The input and output interface 150 may input and output at least one of audio and video signals.

According to an implementation example, the input and output interface 150 may include a port for inputting and outputting only the audio signal and a port for inputting and outputting only the video signal as separate ports, or may be implemented as one port for inputting and outputting both the audio signal and the video signal.

The display 160 may be implemented as various types of displays such as a liquid crystal display (LCD), an organic light emitting diode (OLED) display, a plasma display panel (PDP), and the like. The display 160 may also include a driving circuit, a backlight unit, and the like which may be implemented in the form of an a-si thin film transistor (TFT), a low temperature poly silicon (LTPS) TFT, and an organic TFT (OTFT). Meanwhile, the display 160 may be implemented as a touch screen combined with a touch sensor, a flexible display, a three-dimensional (3D) display, and the like.

In addition, according to an embodiment of the disclosure, the display 160 may include a bezel housing a display panel as well as the display panel that outputs an image. In particular, according to an embodiment of the disclosure, the bezel may include a touch sensor (not illustrated) for sensing user interaction.

Meanwhile, the electronic apparatus 100 may receive a user voice signal from an external device including a microphone. In this case, the received user voice signal may be a digital voice signal, but may be an analog voice signal according to an implementation example. As one example, the electronic apparatus 100 may receive the user voice signal through a wireless communication method such as Bluetooth or Wi-Fi. Here, the external device may be implemented as a remote control device or a smartphone.

The electronic apparatus 100 may transmit a corresponding voice signal to the external server for voice recognition of the voice signal received from the external device.

In this case, the communication module for communicating with the external device and the external server may be implemented as one or separately. For example, the external device may communicate with the Bluetooth module, and the external server may communicate with the Ethernet modem or the Wi-Fi module.

The speaker (not illustrated) may be a component that outputs not only various audio data processed by the input and output interface 150 but also various notification sounds or voice messages.

Meanwhile, the electronic apparatus 100 may further include a microphone (not illustrated). The microphone is a component for receiving a user voice or other sounds and converting the user voice or other sounds into audio data.

The microphone (not illustrated) may receive the user voice in an activated state. For example, the microphone may be integrally formed with an upper side, a front direction, a side direction, or the like of the electronic apparatus 100. The microphone may include various configurations such as a microphone for collecting user voice in an analog form, an amplifier circuit for amplifying the collected user voice, an A/D conversion circuit for sampling and converting the amplified user voice into a digital signal, and a filter circuit for removing a noise component from the converted digital signal. Meanwhile, the electronic apparatus 100 may include a plurality of microphones and may perform stereo recording through the plurality of microphones.

Figure 5:
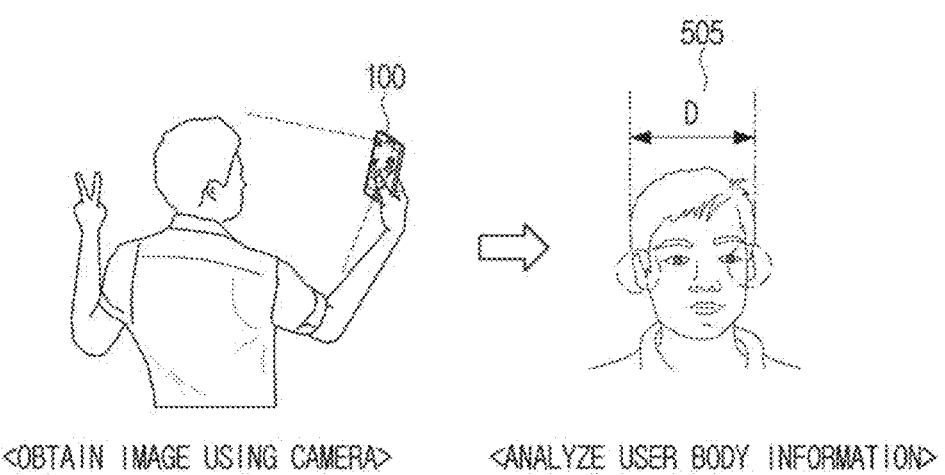
FIG. 5 is a diagram for describing an example of analyzing user body information based on an image captured using a camera.

FIG. 5 is a diagram for describing an example of analyzing user body information based on an image captured using a camera.

Referring to FIG. 5, the electronic apparatus 100 according to an embodiment of the disclosure may capture a user image through the camera 115. In addition, the electronic apparatus 100 may analyze user information based on the captured user image. The user information may include at least one of user body information or user identification information. The electronic apparatus 100 may identify a user's face or a chest including the user's face in the captured image, and identify the user body information such as the user's face size, face shape, head circumference, and ear position. For example, the electronic apparatus 100 may obtain numerical information 505 of the user's head size based on the captured image. In addition, the electronic apparatus 100 may determine the user's face shape based on the obtained numerical information 505 of the head size and the ear position. In addition, the electronic apparatus 100 may determine the gender and age of the user based on the captured image.

In addition, the electronic apparatus 100 may identify the artificial intelligence model 1000 corresponding to at least one of the user body information or the user identification information based on at least one of the user body information or the user identification information.

Meanwhile, the electronic apparatus 100 may obtain space information as well as the user information through the camera 115. For example, the electronic apparatus 100 may analyze the space information of the captured image to identify which space the user is currently in. In addition, the electronic apparatus 100 may identify the artificial intelligence model 1000 corresponding to the obtained space information.

Figure 6:
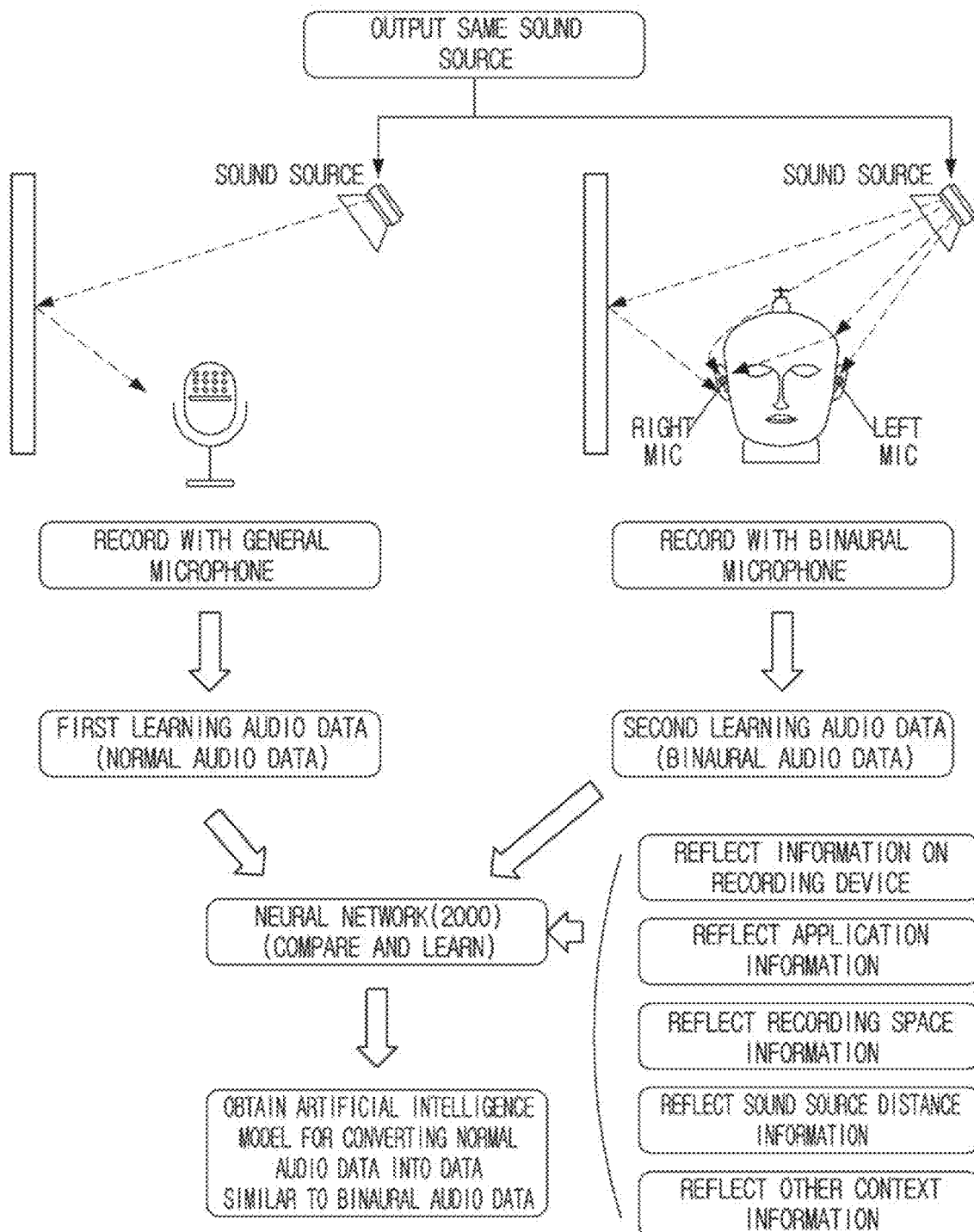
FIG. 6 is a diagram for describing a neural network that learns based on audio data recorded using a general microphone and a binaural microphone and information on a recording device.

FIG. 6 is a diagram for describing a neural network that learns based on audio data recorded using a general microphone and a binaural microphone and information on a recording device.

The neural network 2000 may compare and learn the normal audio data and the binaural audio data as described with reference to FIG. 2, and finally obtain the artificial intelligence model 1000. Here, the neural network 2000 may learn in consideration of at least one of information on a recording device, application information, recording space information, sound source distance information, or other context information in addition to the normal audio data and the binaural audio data.

Here, the information on the recording device may refer to information related to the binaural microphone 207. For example, the information on the recording device may refer to size information of a body model included in the binaural microphone 207. When the binaural microphone 207 includes a dummy head, the information on the recording device may refer to at least one of a head shape, a head size, and a head circumference. When the binaural microphone 207 includes a dummy ear, the information on the recording device may refer to at least one of an ear shape, an ear size, and a position of a microphone attached to the ear. Here, the position of the microphone attached to the ear may refer to a position where the microphone is attached to a dummy external auditory meatus. The neural network 2000 may learn a relationship between the normal audio data and the binaural audio data by additionally considering the information on the recording device.

Here, the application information may refer to a type of application in which a sound source that is a recording target is used. For example, if the recording target is a first music, a music playback application may use the first music, and if the recording target is a second music, a game application may use the second music. Here, the type of sound source is the same as music, but some output settings may vary depending on the application used. The neural network 2000 may learn the relationship between the normal audio data and the binaural audio data by additionally considering the type of application in which the sound source is used.

Here, the recording space information may refer to information on a space in which the normal audio data and the binaural audio data are recorded. For example, the recording space information may be indoor or outdoor. The neural network 2000 may learn the relationship between the normal audio data and the binaural audio data by additionally considering the information on the space in which the recording is performed.

Here, the sound source distance information may refer to a distance between the output sound source and the microphone. In consideration of a difference between the position where the sound source is output and the position of the microphone, the neural network 2000 may identify how the recorded audio signal varies according to the sound source distance information. The neural network 2000 may learn the relationship between the normal audio data and the binaural audio data by additionally considering the sound source distance information.

Here, other context information may refer to various information that may affect the audio data in the process of performing the recording operation. Other context information may include at least one of the type of microphone, the setting status of the microphone, the type of sound source output (e.g., an act of directly speaking by a person, an act of directly making a sound using a tool by a person including playing, and an act of outputting recorded audio data through a speaker), or a sound source output setting. Meanwhile, other context information may include various information in addition to the above-described embodiment.

Figure 7:
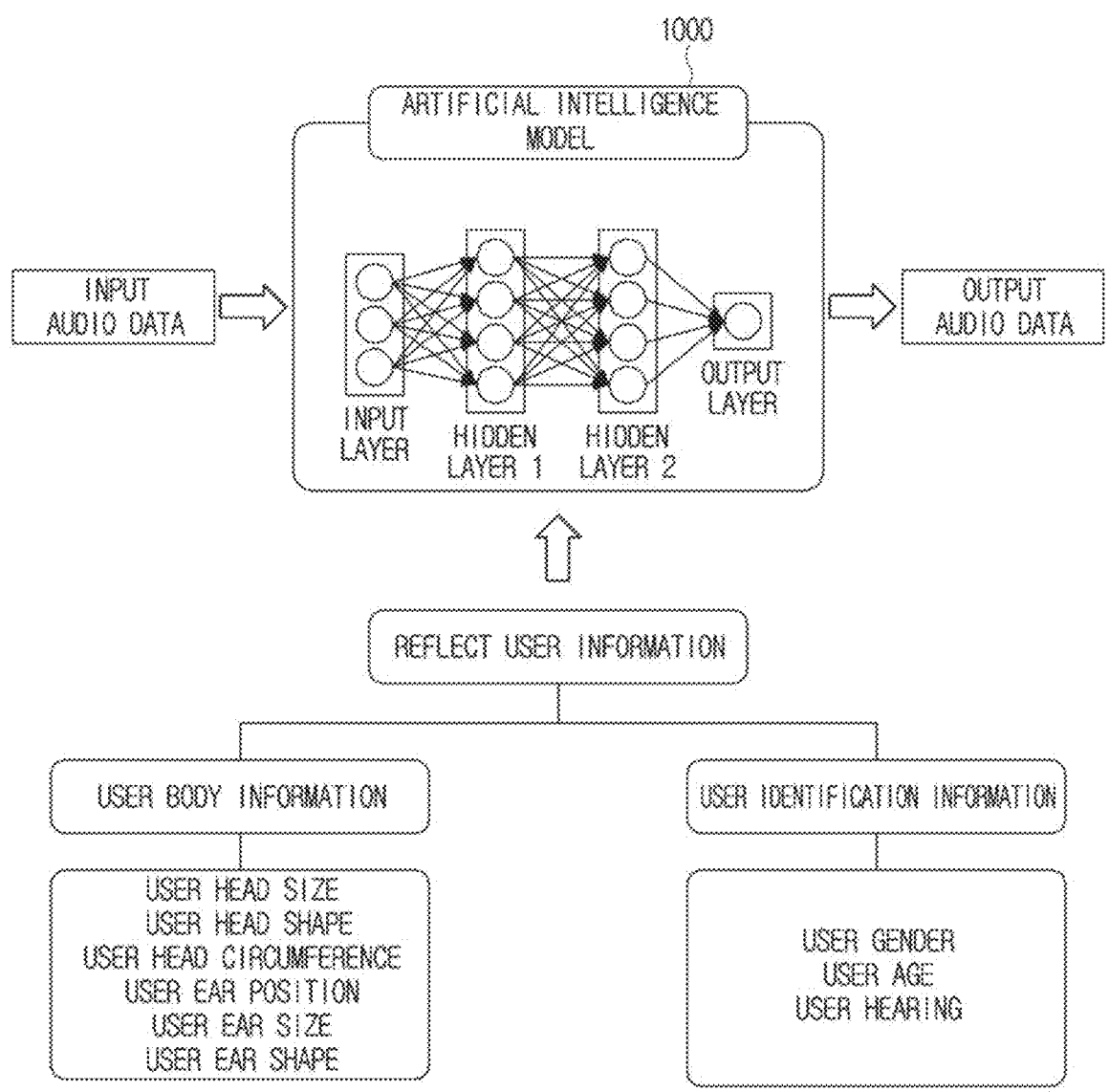
FIG. 7 is a diagram for describing an example of converting audio data based on an artificial intelligence model reflecting user information.

FIG. 7 is a diagram for describing an example of converting audio data based on an artificial intelligence model reflecting user information.

Referring to FIG. 7, the artificial intelligence model 1000 may receive input audio data, convert the received input audio data, and output audio data. Here, the artificial intelligence model 1000 may perform a conversion operation by reflecting user information. Here, the user information may include at least one of user body information or user identification information. The user body information may include at least one of a user head size, a user head shape, a user head circumference, a user ear position, or a user ear size, and the user identification information may include at least one of user gender, user age, or user hearing information.

The artificial intelligence model 1000 may perform binaural rendering based on the user gender, the user age, and the user hearing information. In particular, when the age of the user is high, output audio data suitable for the user may be generated in consideration of the hearing information.

According to an embodiment, the reflecting of the user information may mean identifying an artificial intelligence model 1000 corresponding to the user information among a plurality of artificial intelligence models. In addition, the electronic apparatus 100 may convert the input audio data into the output audio data based on the identified artificial intelligence model 1000.

According to another embodiment, the reflecting of the user information may mean identifying a parameter value of the artificial intelligence model 1000 corresponding to the user information. In addition, the electronic apparatus 100 may convert the input audio data into the output audio data based on the identified parameter value.

When the artificial intelligence model 1000 outputs the output audio data in consideration of the user information, the user may be provided with the audio data suitable for the user.

Figure 8:
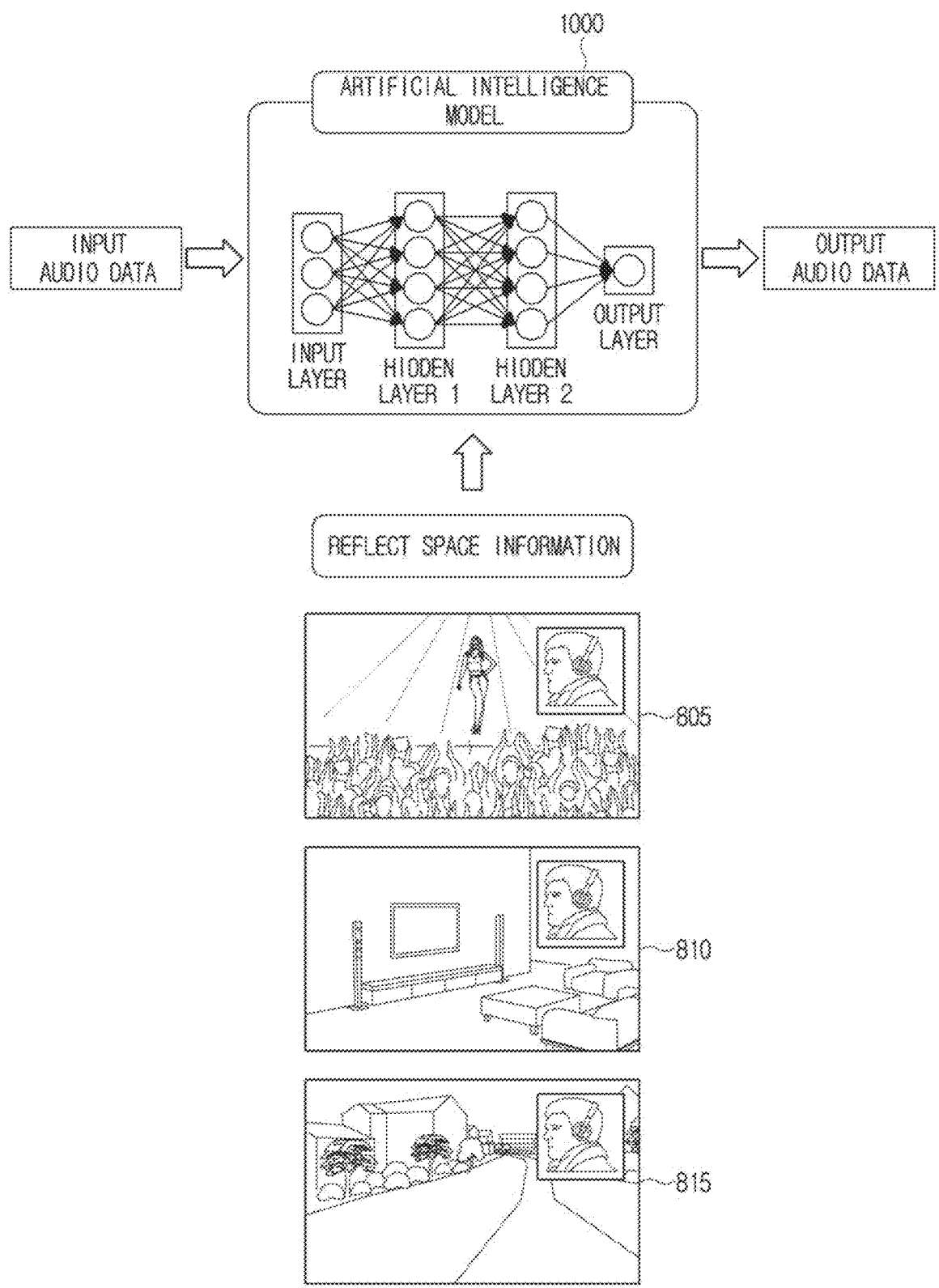
FIG. 8 is a diagram for describing an example of converting audio data based on an artificial intelligence model reflecting space information.

FIG. 8 is a diagram for describing an example of converting audio data based on an artificial intelligence model reflecting space information.

Referring to FIG. 8, the artificial intelligence model 1000 may perform a conversion operation by reflecting space information. Here, the space information may refer to a space in which the user is currently located or a space desired by the user. For example, the space information may refer to a performance hall 805, an indoor space 810, and an outdoor space 815.

If the artificial intelligence model 1000 identifies that the space information is the performance hall 805, the artificial intelligence model 1000 may output the output audio data having a binaural effect, such as listening to the input audio data at the performance hall based on the space information. It is assumed that the user is listening to music before the performance starts at the performance hall. Because the output audio data output by the artificial intelligence model 1000 is based on the space information, the user may feel that the user is listening to at an actual performance hall.

In addition, if the artificial intelligence model 1000 identifies that the space information is the indoor space 810, the artificial intelligence model 1000 may output the output audio data having a binaural effect, such as listening to the input audio data at the indoor space 810 based on the space information. In addition, if the artificial intelligence model 1000 identifies that the space information is the outdoor space 815, the artificial intelligence model 1000 may output the output audio data having a binaural effect, such as listening to the input audio data at the outdoor space 815 based on the space information.

Meanwhile, in FIG. 8, the space information is described as referring to the performance hall 805, the indoor space 810, and the outdoor space 815, but specific space information may be included according to a setting, and the space information is not necessarily limited to the above-described examples.

Figure 9:
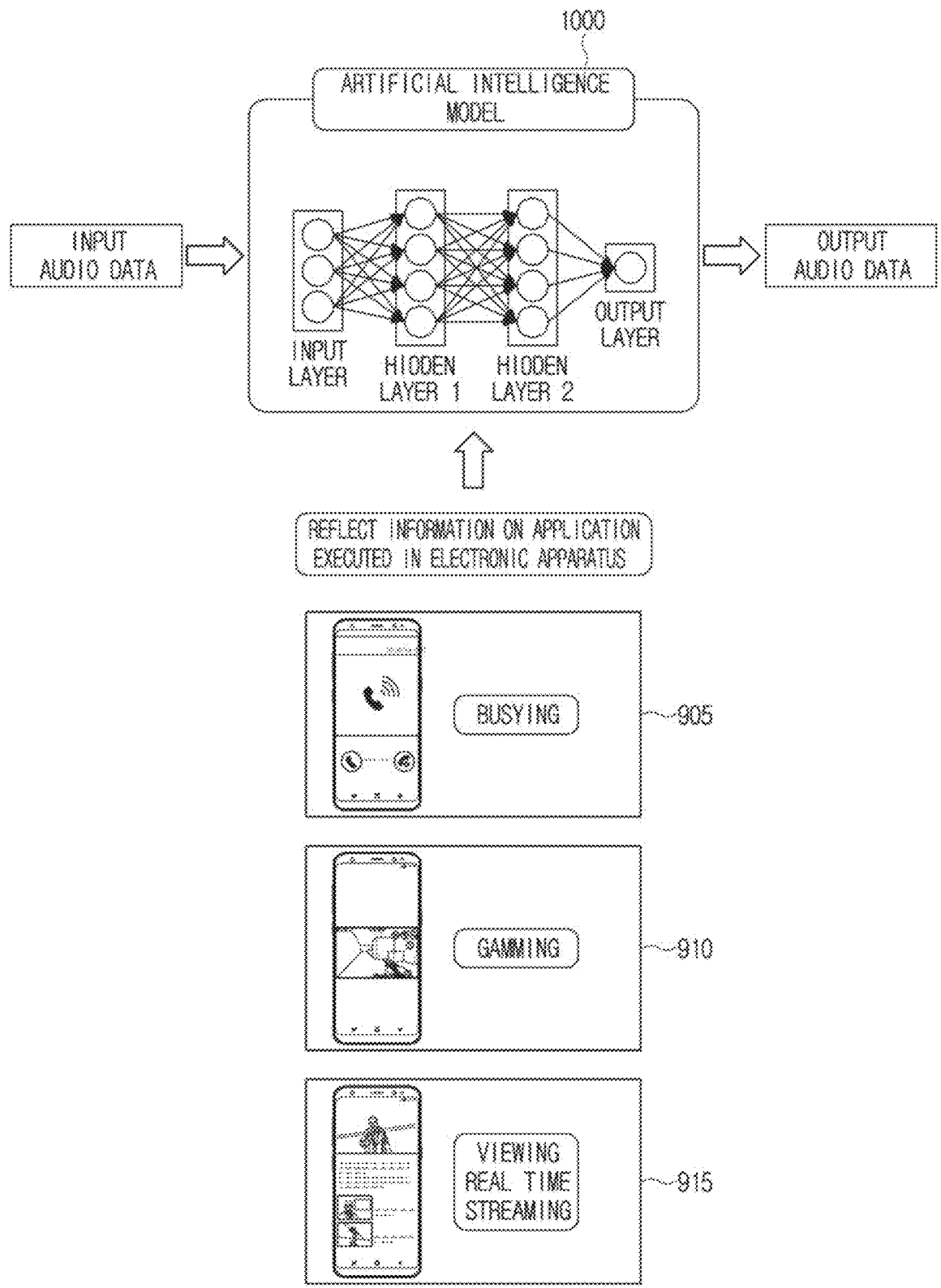
FIG. 9 is a diagram for describing an example of converting audio data based on an artificial intelligence model reflecting application information executed in an electronic apparatus.

FIG. 9 is a diagram for describing an example of converting audio data based on an artificial intelligence model corresponding to application information executed in an electronic apparatus.

Referring to FIG. 9, the artificial intelligence model 1000 may perform a conversion operation by reflecting information on an application executed by the electronic apparatus 100. Here, the information on the application executed in the electronic apparatus 100 may refer to an application currently displayed on the display of the electronic apparatus 100 among a plurality of applications which are currently executed. When the number of applications which are executed is one, the artificial intelligence model 1000 may perform the conversion operation based on information on the one application.

According to one example 905, when the information on the application being executed by the electronic apparatus 100 refers to an application related to a call, the artificial intelligence model 1000 may identify the artificial intelligence model 1000 corresponding to the application related to the call or a parameter of the artificial intelligence model 1000. In addition, the artificial intelligence model 1000 may output the output audio data converted to give a feeling of talking on the side.

According to another example 910, when the information on the application being executed by the electronic apparatus 100 refers to an application related to a game, the artificial intelligence model 1000 may output the output audio data of a changed sound quality specialized in game sound.

According to still another example 915, when the information on the application being executed by the electronic apparatus 100 is related to an application using a real time streaming function, the artificial intelligence model 1000 may output the output audio data in consideration of at least one of the size or type of data transmitted in real time.

Figure 10:
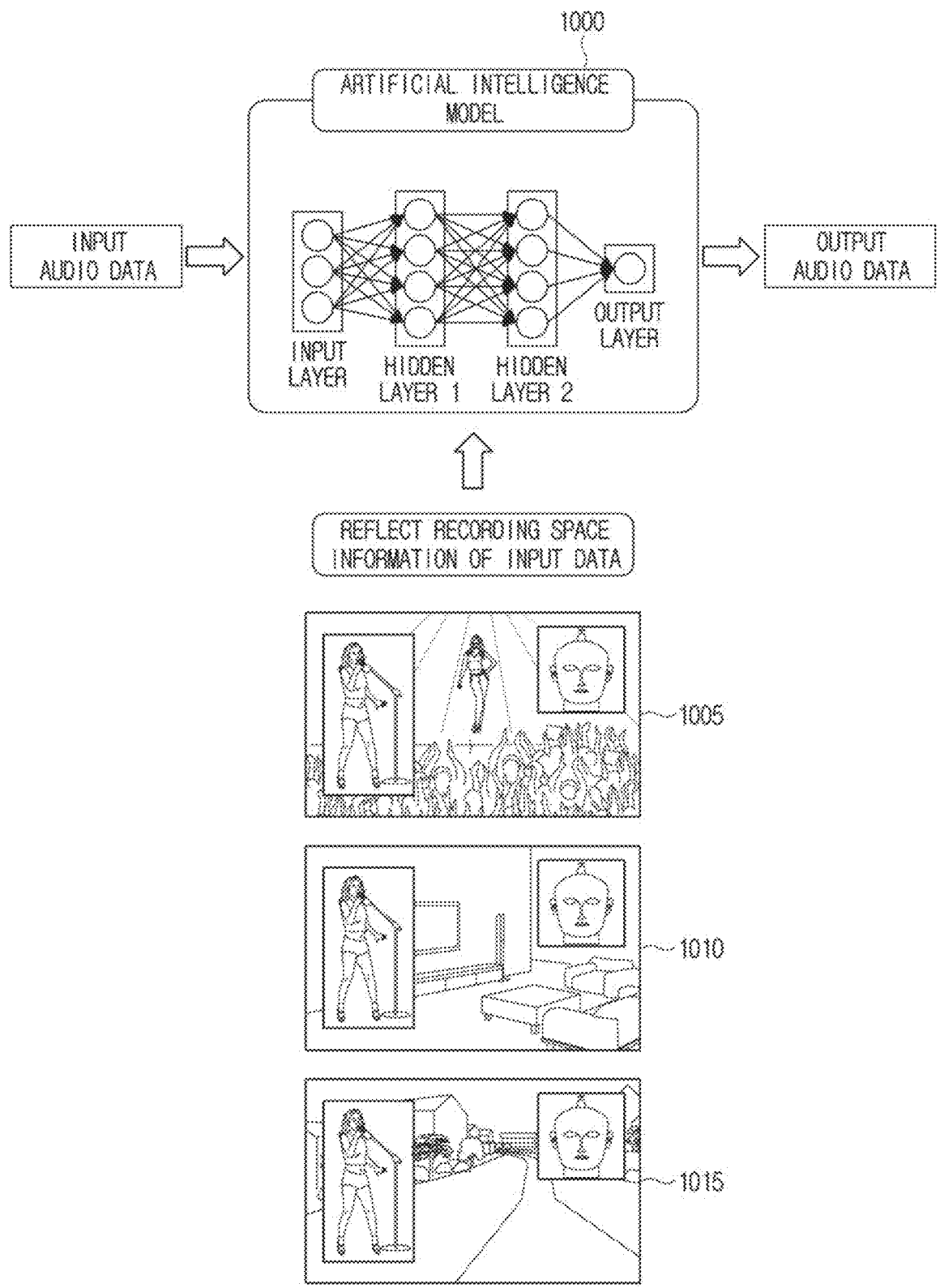
FIG. 10 is a diagram for describing an example of converting audio data based on an artificial intelligence model reflecting recording space information of input data.

FIG. 10 is a diagram for describing an example of converting audio data based on an artificial intelligence model reflecting recording space information of input data.

Referring to FIG. 10, the artificial intelligence model 1000 may perform a conversion operation by reflecting recording space information of the input audio data. The output audio data may vary depending on where the input audio data is recorded. For example, audio data recorded in a performance hall 1005, audio data recorded in an indoor space 1010, and audio data recorded in an outdoor space 1015 may be converted in different ways. The artificial intelligence model 1000 may identify the artificial intelligence model 1000 corresponding to the recording space information of the input audio data or a parameter of the artificial intelligence model 1000, based on the recording space information of the input audio data.

According to an embodiment, the recording space information of the input audio data may be obtained by analyzing the received input audio data. The electronic apparatus 100 may identify the recording space information of the input audio data in consideration of a frequency signal (e.g., frequency waveform, frequency magnitude, frequency pattern) of the obtained input audio data.

According to another embodiment, the recording space information may be included in the input audio data. The input audio data may include the audio signal and the recording space information, and the artificial intelligence model 1000 may convert the audio signal using the recording space information included in the input audio data.

Figure 11:
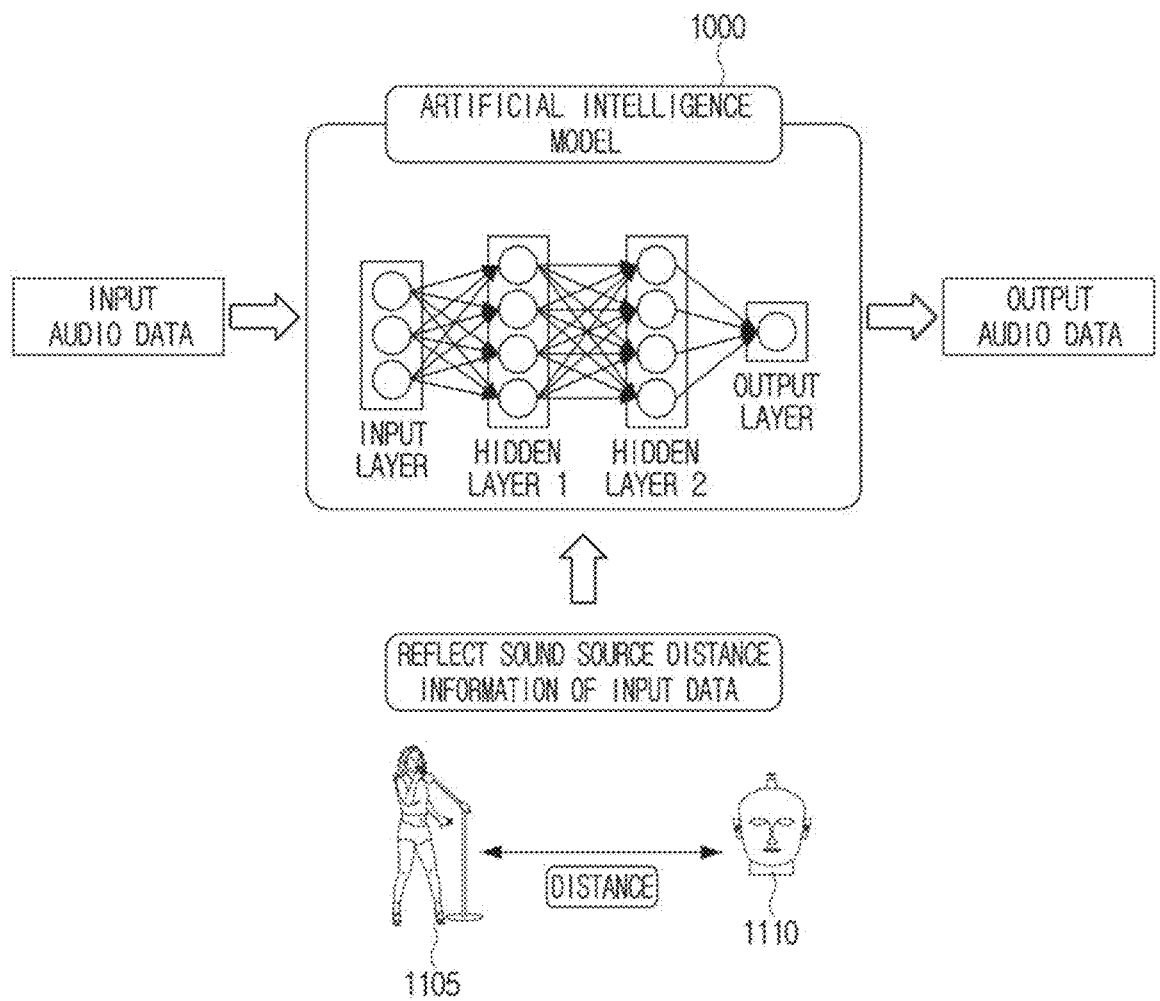
FIG. 11 is a diagram for describing an example of converting audio data based on an artificial intelligence model reflecting sound source distance information of input data.

FIG. 11 is a diagram for describing an example of converting audio data based on an artificial intelligence model reflecting sound source distance information of input data.

Referring to FIG. 11, the artificial intelligence model 1000 may reflect sound source distance information of the input audio data. Here, the sound source distance information of the input audio data may refer to a distance between a sound source 1105 and a binaural microphone 1110 receiving sound from the sound source 1105. The artificial intelligence model 1000 may identify the artificial intelligence model 1000 or a parameter of the artificial intelligence model 1000 in consideration of the sound source distance information of the input audio data. When the sound source distance information is relatively close, the artificial intelligence model 1000 may output the converted output audio data to make the audio signal feel as if it is heard nearby. When the sound source distance information is relatively far, the artificial intelligence model 1000 may output the converted output audio data to make the sound feel as if it is heard from a distance.

Meanwhile, the sound source distance information may be obtained by analyzing a frequency signal of the input audio data or may be implemented in a form included in the input audio data.

Figure 12:
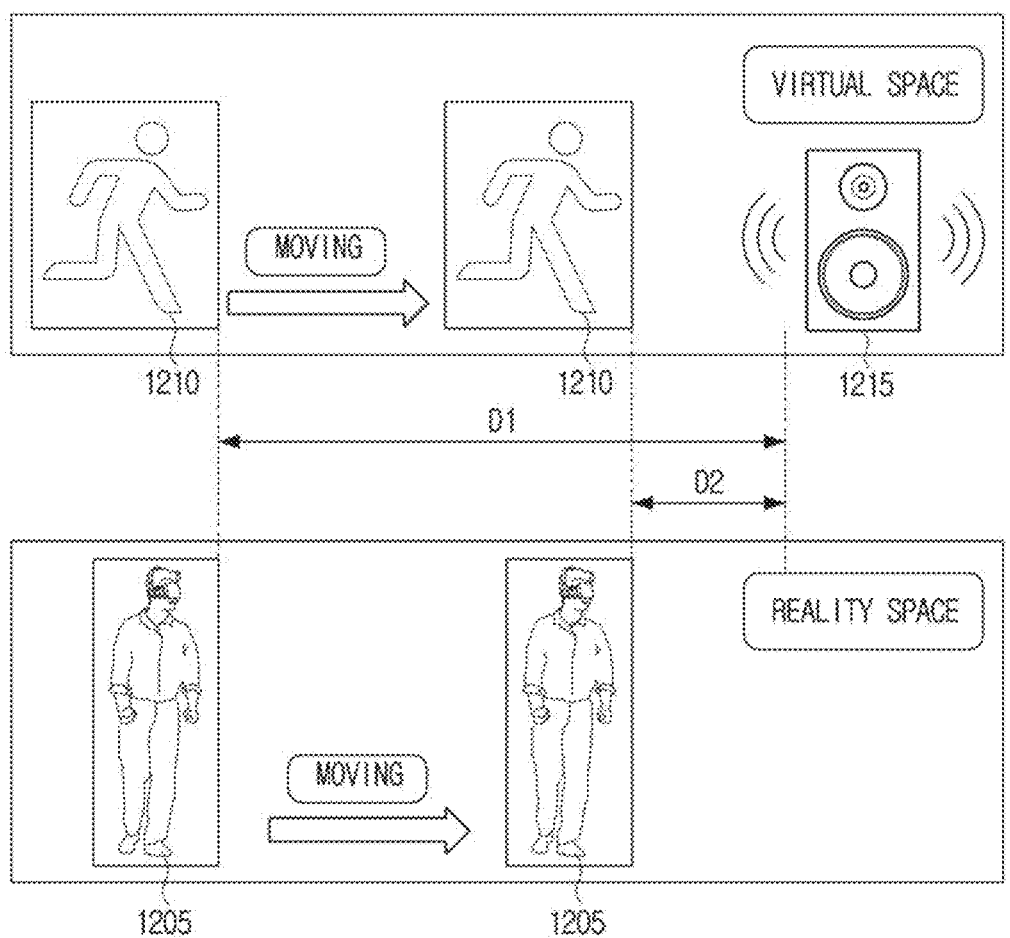
FIG. 12 is a diagram for describing an example of differently controlling an output of audio data according to a motion of a reality space.

FIG. 12 is a diagram for describing an example of differently controlling an output of audio data according to a motion of a reality space.

Referring to FIG. 12, an output of the audio data may be controlled by using the sound source distance information of the input audio data described with reference to FIG. 11. When the sound source distance of the input audio data is D1, the artificial intelligence model 1000 may output the output audio data that makes the audio signal feel as if it is heard at a distance apart from D1.

Here, it is assumed that the user uses a virtual reality (VR) device. For convenience of explanation, it is assumed that the sound source distance information of the input audio data and distance information i.e., information on a distance between a virtual character 1210 and a virtual speaker 1215 from which sound is output in a virtual space are the same.

Here, when a user 1205 moves a certain distance in a reality space, the virtual character 1210 may move a certain distance in the virtual space. For example, when the user 1205 moves a certain distance in the reality space and the distance between the virtual character 1210 and the virtual speaker 1215 in the virtual space is reduced to D2, the artificial intelligence model 1000 may output the output audio data that makes the audio signal feel as if it is heard at a distance of D2.

In addition, when the user 1205 moves a certain distance in a direction of sound, the artificial intelligence model 1000 may output the output audio data that makes the sound become louder as the user moves.

Meanwhile, although the VR device and the virtual space have been described with reference to FIG. 12, the artificial intelligence model 1000 may also be applied to an augmented reality field.

Figure 13:
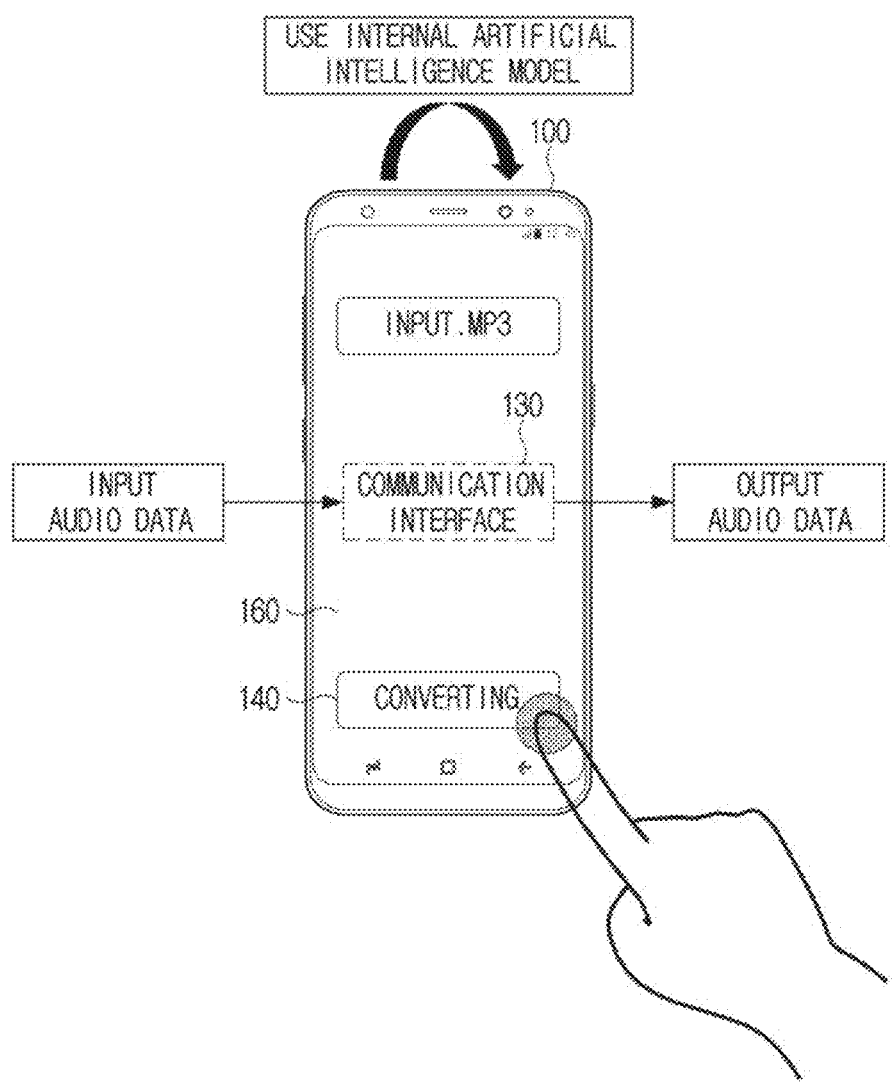
FIG. 13 is a diagram for describing an example of converting audio data using an artificial intelligence model stored in an electronic apparatus.

FIG. 13 is a diagram for describing an example of converting audio data using an artificial intelligence model stored in an electronic apparatus.

Referring to FIG. 13, the electronic apparatus 100 may receive the input audio data through the communication interface 130. In addition, the electronic apparatus 100 may improve or convert the input audio data according to a preset event (e.g., a user's touch input). Specifically, the electronic apparatus 100 may improve or convert the received input audio data by using an artificial intelligence model stored therein, and may obtain the output audio data. The artificial intelligence model 1000 may be stored in the memory 110 of the electronic apparatus 100. For example, it is assumed that the electronic apparatus 100 receives a 'music.mp3' file that is normal audio data. When the electronic apparatus 100 identifies that the user touches a specific UI displayed on the display 160, the electronic apparatus 100 may obtain binaural audio data by converting the 'music.mp3' file. Here, the file conversion operation may refer to the binaural rendering. Here, the specific UI may be implemented in the form of a touch pad by the user interface 140. Meanwhile, the communication interface 130 may transmit the converted audio data (i.e., output audio data) to an external device or an external server through the communication interface 130. Here, the external device may refer to an external speaker.

Meanwhile, although FIGS. 13 to 19 illustrate that the display 160 and the user interface 140 are separate, the electronic apparatus 100 may be implemented in the form of a touch display as a kind of the user interface 140.

Figure 14:
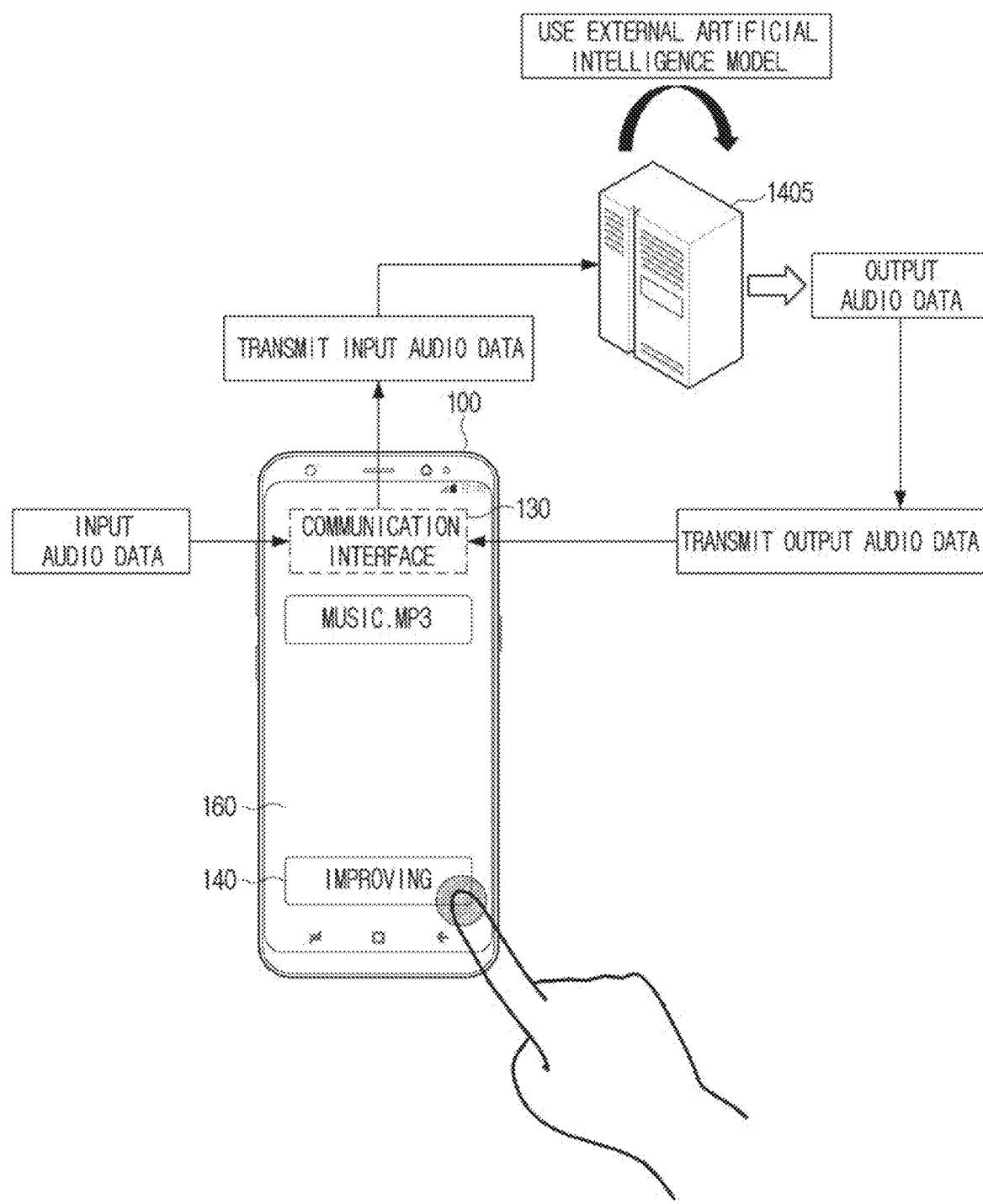
FIG. 14 is a diagram for describing an example of converting audio data using an artificial intelligence model stored in an external server.

FIG. 14 is a diagram for describing an example of converting audio data using an artificial intelligence model stored in an external server.

Referring to FIG. 14, the electronic apparatus 100 may receive the input audio data through the communication interface 130. In addition, the electronic apparatus 100 may transmit the input audio data to an external server 1405 through the communication interface 130 to improve or convert the input audio data based on a preset event (e.g., a user's touch input). The external server 1405 may store the artificial intelligence model, and the external server 1405 may obtain the output audio data by converting the input audio data received from the electronic apparatus 100. In addition, the external server 1405 may transmit the obtained output audio data to the electronic apparatus 100. In addition, the electronic apparatus 100 may receive the output audio data transmitted from the external server 1405 through the communication interface 130.

Figure 15:
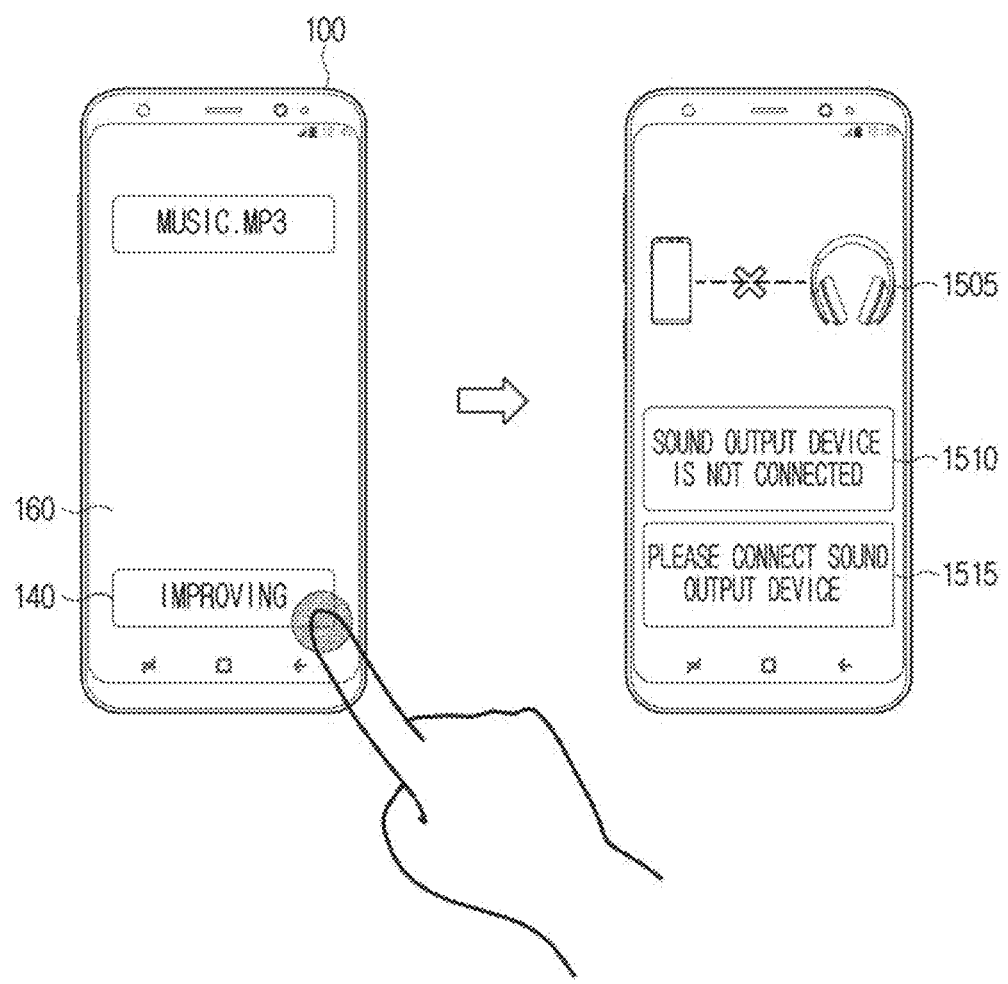
FIG. 15 is a diagram for describing a guide user interface (UI) for guiding a sound output device to be connected.

FIG. 15 is a diagram for describing a guide user interface (UI) for guiding a sound output device to be connected.

Referring to FIG. 15, when the electronic apparatus 100 identifies a preset event, the electronic apparatus 100 may identify whether a sound output device is connected to the electronic apparatus 100. Here, the sound output device may be connected to the electronic apparatus 100 by a wireless or wired manner. In addition, when the electronic apparatus 100 identifies that there is no sound output device connected to the electronic apparatus 100, the electronic apparatus 100 may control the display 160 to display at least one of an image 1505 indicating that the sound output device is not connected, a text UI 1510 indicating that the sound output device is not connected, or a guide UI 1515 for inducing a connection of the sound output device.

The reason for checking whether a separate sound output device is connected instead of the internal speaker of the electronic apparatus 100 is because the audio data converted by the artificial intelligence model 1000 may maximize the binaural effect in a specific speaker instead of the general speaker.

According to an embodiment, in order to output binaural audio data, a two-channel speaker may be required, and the electronic apparatus 100 may determine whether the connected sound output device is the two-channel speaker. Therefore, when the electronic apparatus 100 identifies that the two-channel speaker is not connected to the electronic apparatus 100, the electronic apparatus 100 may display at least one of the image 1505 indicating that the sound output device is not connected, the text UI 1510 indicating that the sound output device is not connected, or the guide UI 1515 for inducing a connection of the sound output device.

In addition, the binaural audio data is collected by a microphone attached to the actual human body model, and it may be preferable to use earphones or headphones for the effect of the binaural audio data. Therefore, the electronic apparatus 100 may determine whether the sound output device connected to the electronic apparatus 100 is a speaker (e.g., an earphone or a headphone) that is in contact with the ear portion of the user. Therefore, when the electronic apparatus 100 identifies that the earphone or the headphone is not connected to the electronic apparatus 100, the electronic apparatus 100 may display at least one of the image 1505 indicating that the sound output device is not connected, the text UI 1510 indicating that the sound output device is not connected, or the guide UI 1515 for inducing a connection of the sound output device.

Figure 16:
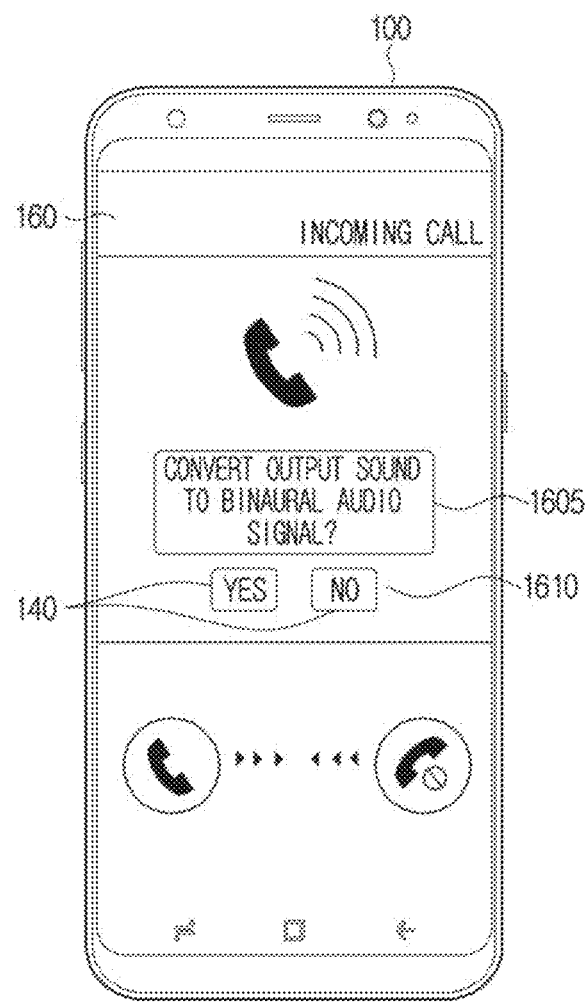
FIG. 16 is a diagram for describing a UI related to an audio data conversion operation according to an embodiment.

FIG. 16 is a diagram for describing a UI related to an audio data conversion operation according to an embodiment.

Referring to FIG. 16, the electronic apparatus 100 may determine whether to perform a binaural rendering operation through the artificial intelligence model 1000 based on the application information being currently executed. The binaural rendering may be used in an operation of outputting the audio signal.

According to an embodiment, when an application related to the output of the audio signal is executed, the electronic apparatus 100 may provide a UI 1605 that inquires whether to perform the binaural rendering.

In addition, the electronic apparatus 100 may provide a UI 1610 that receives a user's selection about whether to perform the binaural rendering. When the electronic apparatus 100 receives the user's selection through the UI 1610, the electronic apparatus 100 may control the application to correspond to the user's selection. When the user' selection to perform the binaural rendering is received from the application being executed, the electronic apparatus 100 may perform the binaural rendering operation on the audio signal output from the application being executed. The user may listen to the converted audio signal in the application being currently executed.

The UI that inquires whether to perform the binaural rendering illustrated in FIG. 16 may be displayed on the display 160 whenever an audio related application is executed. However, the operation of displaying the UI may be changed according to the user's setting. When a user selection for performing the binaural rendering over a preset number of times is received, the electronic apparatus 100 may automatically perform the binaural rendering operation and may not display the UI that inquires whether to perform the binaural rendering any more.

Meanwhile, according to another embodiment, the electronic apparatus 100 may provide a UI 1605 that inquires whether to perform the binaural rendering at a time when an operation related to the output of the audio signal needs to be performed. The electronic apparatus 100 may identify whether to perform the operation of outputting the audio signal. In addition, if the electronic apparatus 100 determines to output the audio signal, the electronic apparatus 100 may provide the UI 1605 that inquires whether to perform the binaural rendering before outputting the audio signal.

Meanwhile, according to still another embodiment, the electronic apparatus 100 may display a list of applications capable of performing the binaural rendering operation on the display 160. In addition, an application requiring the binaural rendering may be selected by the user from the list of applications displayed on the display 160. It is assumed that the number of applications stored in the electronic apparatus 100 is 100. It is assumed that 50 applications among the 100 applications perform the operation of outputting the audio signal. The electronic apparatus 100 may display a list of 50 applications related to the output of the audio signal among the 100 applications. In addition, an application requiring the binaural rendering may be selected by the user. It is assumed that there are 10 applications for which the user determines to perform the binaural rendering. The electronic apparatus 100 may automatically perform the binaural rendering operation on the 10 applications determined by the user and may not inquire about an intention of the user through a separate UI.

Figure 17:
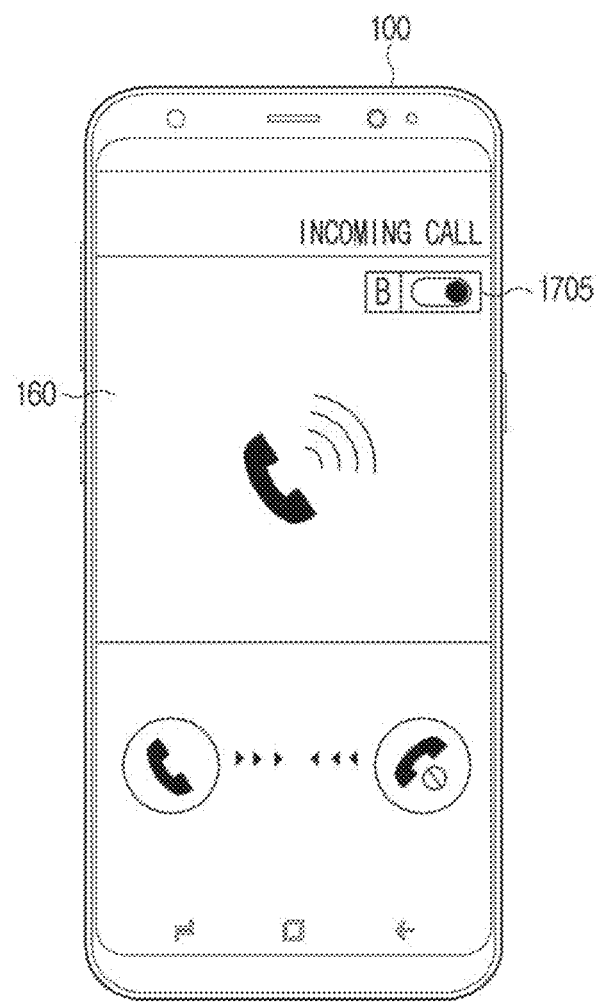
FIG. 17 is a diagram for describing a UI related to an audio data conversion operation according to another embodiment.

FIG. 17 is a diagram for describing a UI related to an audio data conversion operation according to another embodiment.

Referring to FIG. 17, the electronic apparatus 100 may display on the display 160 a UI 1705 displaying whether the binaural rendering is currently being performed in the application. Here, "B" displayed on the UI 1705 may be an initial meaning binaural.

According to an embodiment, the electronic apparatus 100 may display that the binaural rendering operation may be currently executed by providing the UI 1705. As illustrated in FIG. 17, the displaying of the UI 1705 may mean that the electronic apparatus 100 may perform the binaural rendering upon input of the audio signal.

In addition, the electronic apparatus 100 may provide a UI 1705 that selects whether to perform the binaural rendering operation. The user may switch to a mode (e.g., first setting state) for performing the binaural rendering operation or a mode (e.g., second setting state) for not performing the binaural rendering operation through the UI 1705. The electronic apparatus 100 may perform the binaural rendering operation by converting the input audio data in the first setting state. In addition, the electronic apparatus 100 may output the input audio data as it is without conversion in the second setting state.

Meanwhile, according to another embodiment, the electronic apparatus 100 may display information on whether the audio data on which the binaural rendering is currently performed is output through the UI 1705. For example, when the audio signal is received and the user directly listens to the audio signal, the electronic apparatus 100 may change the color or shape of the UI 1705. The electronic apparatus 100 may provide the UI 1705 so that the user may know that the audio signal currently being listened to is the converted audio signal (i.e., the binaural rendering is performed) through the changed UI 1705.

Figure 18:
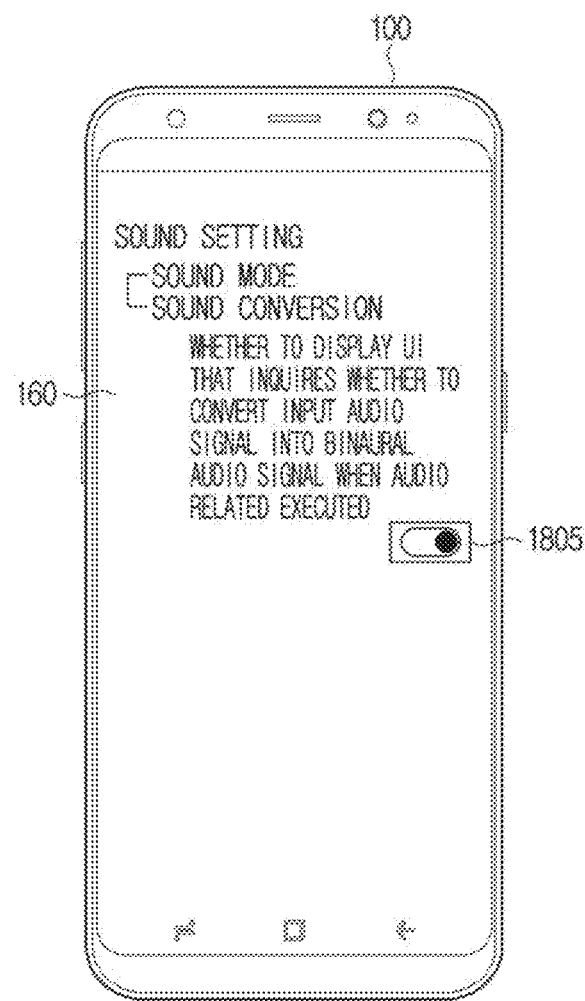
FIG. 18 is a diagram for describing a setting screen related to an audio data conversion operation according to an embodiment.

FIG. 18 is a diagram for describing a setting screen related to an audio data conversion operation according to an embodiment.

Referring to FIG. 18, the electronic apparatus 100 may separately display a sound setting (or audio setting) UI 1805 capable of controlling whether to display the UIs 1605 and 1610 illustrated in FIG. 16 on the display. Specifically, when an audio related application is executed, the electronic apparatus 100 may display a UI that inquires whether to convert an input audio signal into a binaural audio signal. Here, the electronic apparatus 100 may display the UI 1805 to select whether to display or not display the UI that inquires whether to convert to the binaural audio signal in a setting related to sound. The electronic apparatus 100 may determine whether to display the UIs 1605 and 1610 illustrated in FIG. 16 on the display based on the user's selection, and the user's selection may be stored in the memory.

Figure 19:
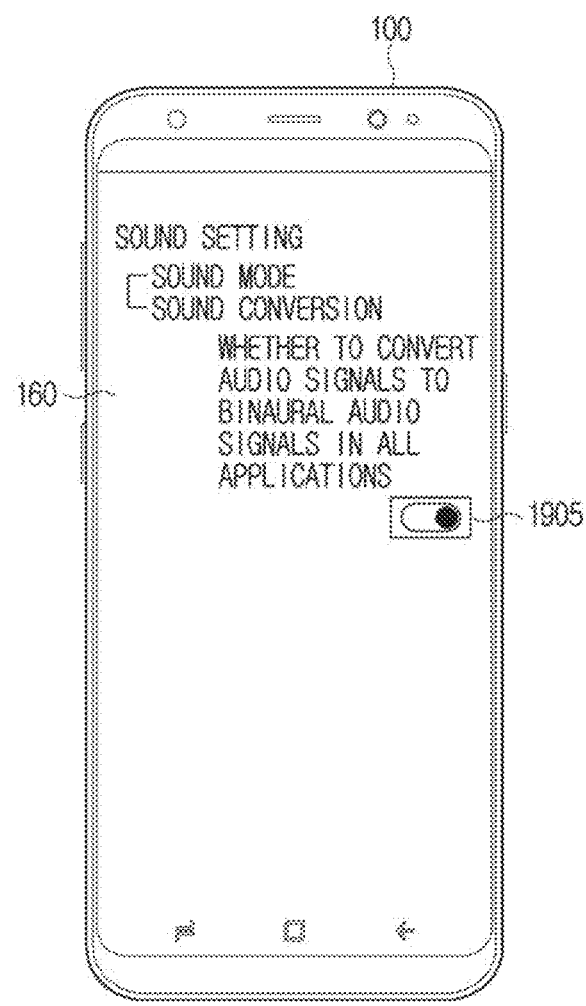
FIG. 19 is a diagram for describing a setting screen related to an audio data conversion operation according to another embodiment.

FIG. 19 is a diagram for describing a setting screen related to an audio data conversion operation according to another embodiment.

Referring to FIG. 19, the electronic apparatus 100 may determine whether to perform the binaural rendering on audio signals output from all applications (e.g., all applications outputting audio signals). In addition, the electronic apparatus 100 may receive a user's selection through a UI 1905. Unlike the embodiment disclosed with reference to FIG. 18, the electronic apparatus 100 may not display the UI that inquires of the user whether to perform the binaural rendering. In addition, the electronic apparatus 100 may perform the binaural rendering in all applications outputting the audio signals based on the user's selection through the UI 1905. When the electronic apparatus 100 stores the user's selection in the memory based on the UI 1905, the electronic apparatus 100 may determine whether to perform the binaural rendering in all applications based on the user's selection stored in the memory.

Meanwhile, although the UIs disclosed in FIGS. 18 and 19 have been described as being described in parallel, the electronic apparatus 100 may be implemented in a form to which the setting disclosed in FIG. 18 and the setting disclosed in FIG. 19 are simultaneously applied. For example, if the user has set the binaural rendering to be performed for all applications in the UI 1905, the binaural rendering is always performed regardless of the setting state of the UI 1805 illustrated in FIG. 18, and separate inquiry UIs 1605 and 1610 may not be displayed. However, if the user has set the binaural rendering not to be performed for all applications in the UI 1905, the electronic apparatus 100 may determine whether the inquiry UIs 1605 and 1610 are displayed on the display 160 based on the setting state of the UI 1805 disclosed in FIG. 18.

Figure 20:
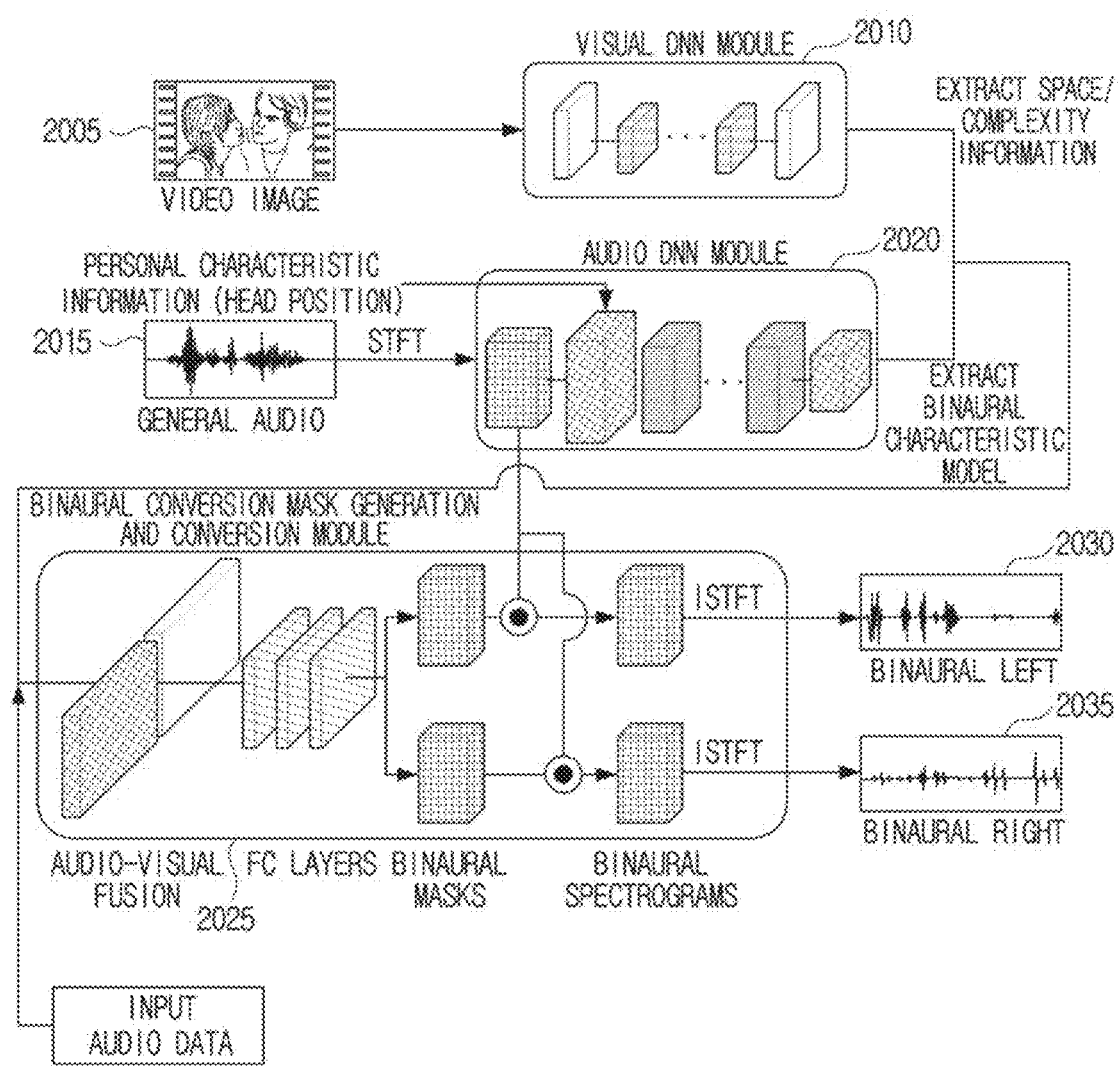
FIG. 20 is a diagram for describing an example of converting input data including both image data and audio data.

FIG. 20 is a diagram for describing an example of converting input data including both image data and audio data.

Referring to FIG. 20, the neural network may perform a learning operation based on a video image 2005 and a general audio signal 2015. The result of the learning operation may be a binaural conversion mask generation and conversion module 2025.

Specifically, the neural network may receive the video image 2005, learn based on the received video image 2005 and a visual deep neural network (DNN) module 2010, and obtain space information and complexity information corresponding to the space information. Here, the space information may refer to information indicating where a space included in the video image 2005 is. In addition, the complexity information corresponding to the space information may refer to information indicating how many people exist in the video image 2005.

In addition, the neural network may receive the general audio signal 2015 and obtain a binaural characteristic model based on the received audio signal 2015 and an audio deep neural network (DNN) module 2020. Here, the received audio signal may correspond to the received video image and may be data synchronized based on time information. Specifically, the neural network may perform a short-time Fourier transform (STFT) based on at least one of the received general audio signal 2015 and a binaural audio signal corresponding to the general audio signal 2015. In addition, based on the audio signal transformed by the short-time Fourier transform, the audio DNN module 2020 may obtain the binaural characteristic model. Here, the audio DNN module 2020 may obtain the binaural characteristic model in consideration of personal characteristic information such as a head position. Here, the personal characteristic information may refer to information related to the dummy head or the dummy ear included in the binaural microphone. In addition, in a learning process performed in the audio DNN module 2020, some data may be used in the binaural conversion mask generation and conversion module 2025.

Meanwhile, the neural network may obtain the binaural conversion mask generation and conversion module 2025 based on the visual DNN module 2010 and the audio DNN module 2020. In addition, the obtained binaural conversion mask generation and conversion module 2025 may generate binaural audio data by performing binaural rendering when input data is received. Here, the input data may include an audio signal and a video signal together. Specifically, the binaural conversion mask generation and conversion module 2025 may include full-connected (FC) layers, and may combine or fusion the audio signal and the video signal so that the combined signal passes through the FC layers. In addition, the binaural conversion mask generation and conversion module 2025 may finally generate a binaural left audio signal 2030 and a binaural right audio signal 2035 by using binaural masks, binaural spectrograms, and an inverse short-time Fourier transform (ISTFT).

Meanwhile, when the binaural conversion mask generation and conversion module 2025 receives the input data including the audio signal and the video signal, the binaural conversion mask generation and conversion module 2025 may generate the binaural audio signal by using at least one of the audio signal, the video signal, space information corresponding to the video signal, complexity information corresponding to the space information, and personal characteristic information of the user (e.g., user's head size, ear size, etc.).

Figure 21:
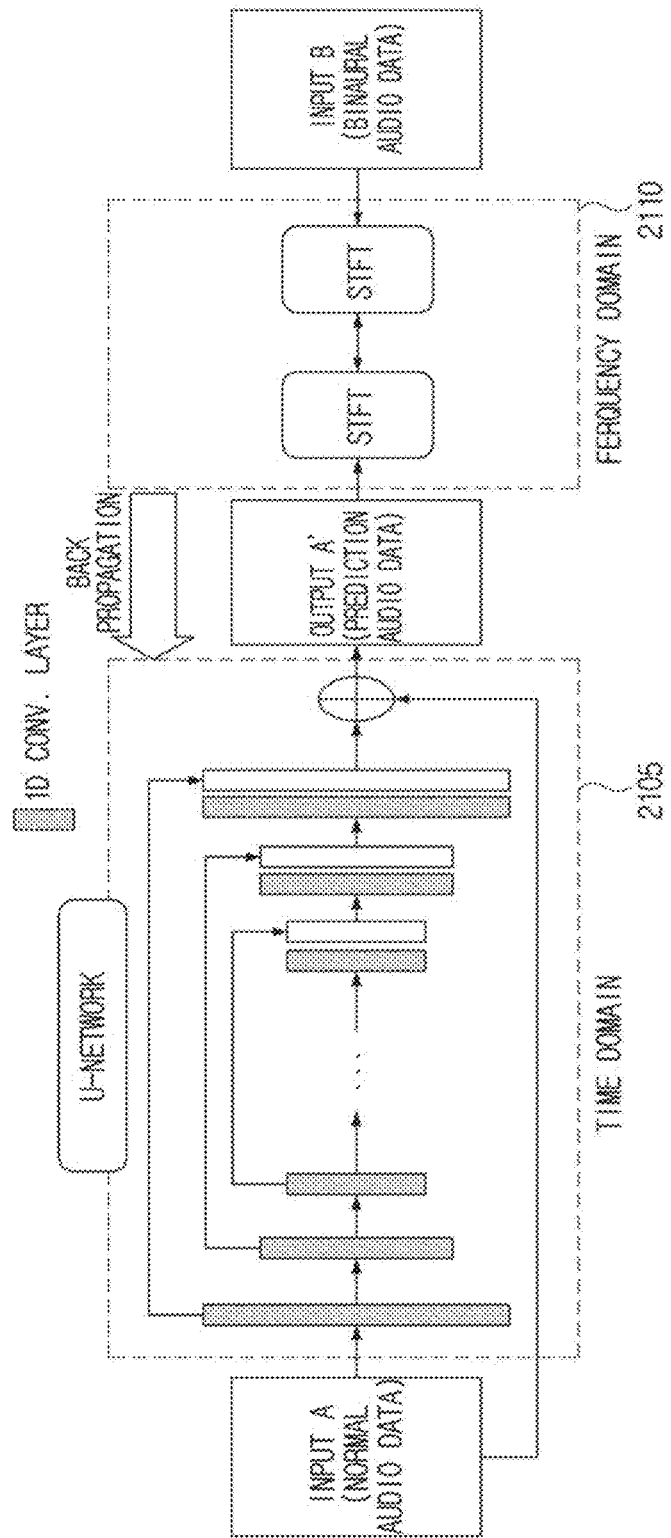
FIG. 21 is a diagram for describing an example of a process of learning an artificial intelligence model for converting audio data.

FIG. 21 is a diagram for describing an example of a process of learning an artificial intelligence model for converting audio data.

Referring to FIG. 21, the neural network may learn based on normal audio data and binaural audio data corresponding to the normal audio data, and the learning result may be the artificial intelligence model 1000. The artificial intelligence model 1000 may be a model for performing binaural rendering.

The neural network may receive two inputs. The number of channels of audio data input to the neural network may vary. For example, the neural network may receive learning audio data as audio data of one channel, two channels, . . . , n channels, and the like. The neural network may receive normal audio data (i.e., input A, first learning data). The neural network may input the received normal audio data into a U-network, and the normal audio data may be changed to prediction audio data, i.e., output A' (e.g., expected audio data, calculation data, calculated data, calculation audio data, calculated audio data or intermediate calculation data) through one-dimensional (1D)-convolutional layer of the U-network 2105. Here, although the convolutional layer is described in one dimension, a convolutional layer of two or more dimensions is also possible.

Here, the U-network 2105 may refer to a U-shaped architecture including a contracting path and an expansive path, and may be a type of convolutional neural network (CNN). The transformation process of the normal audio data performed in the U-network 2105 may be performed in a time domain. Meanwhile, in the description of FIG. 21, the U-network 2105 according to an embodiment has been described as including the 1D-convolution layer. The U-network 2105 according to another embodiment may include a multidimensional convolutional layer.

The neural network may calculate a loss value based on the prediction audio data obtained through the U-network 2105 and binaural audio data (i.e., input B, second learning data) corresponding to the normal audio data. A loss value calculation module 2110 may be calculated in a frequency domain. The loss value calculation module 2110 may include an operation of performing a short-time Fourier transform (STFT) on the prediction audio data and performing the STFT on the binaural audio data (i.e., input B, second learning data). In addition, the loss value calculation module 2110 may compare the Fourier transformed values to obtain a loss value in the frequency domain.

The neural network may perform back propagation based on the obtained loss value. Here, the back propagation may be performed in a direction from the loss value calculation module 2110 to the U-network 2105.

Figure 22:
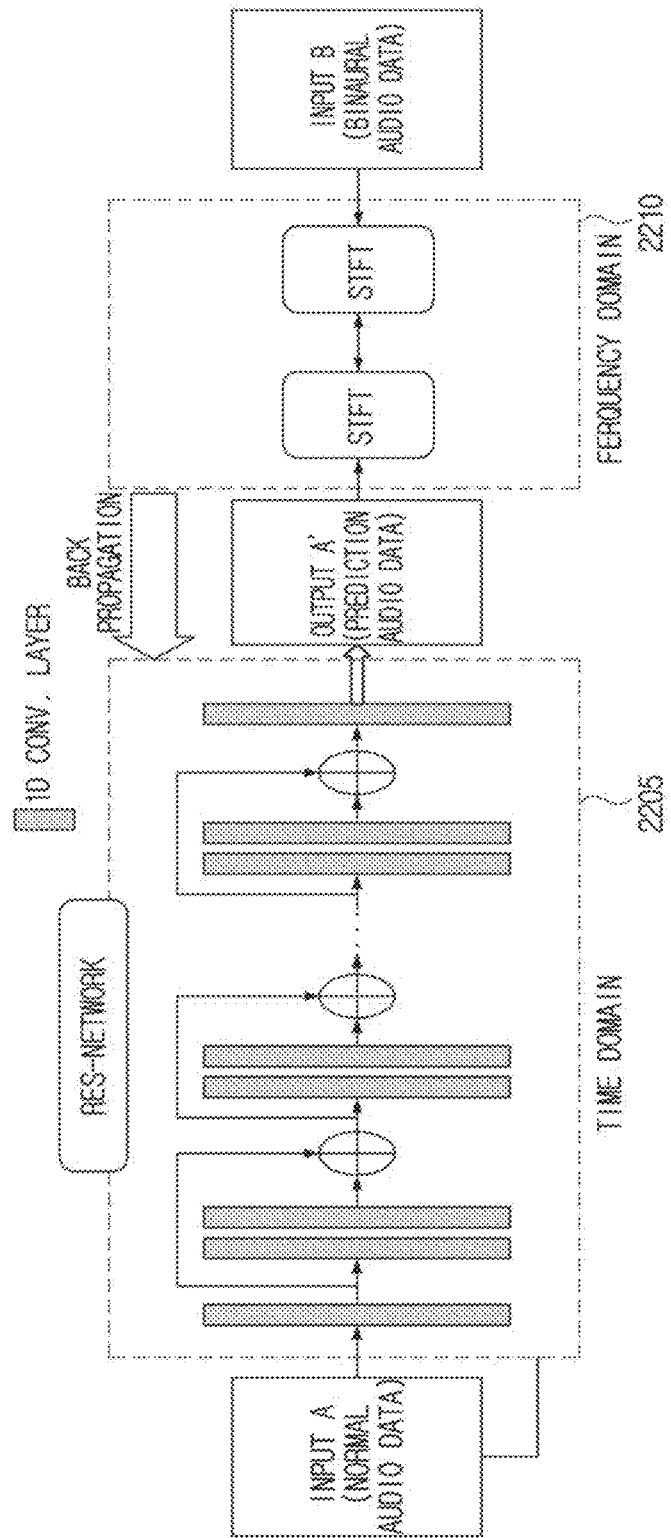
FIG. 22 is a diagram for describing another example of a process of learning an artificial intelligence model for converting audio data.

FIG. 22 is a diagram for describing another example of a process of learning an artificial intelligence model for converting audio data.

Referring to FIG. 22, the neural network may generate prediction audio data (i.e., output A') in a time domain and calculate a loss value in a frequency domain. Here, the network generating the prediction audio data may be a Res-Network 2205. The Res-Network 2205 may refer to a residual network, and the Res-Network 2205 may be an artificial neural network (ANN) that uses a skip connection or uses short-cuts by jumping some layers.

The neural network may perform a loss value calculation module 2210 in the frequency domain based on the prediction audio data obtained through the Res-network 2205 and binaural audio data, and perform a back propagation operation based on the loss value.

The operation described with reference to FIG. 22 may be applied in the same manner to that described with reference to FIG. 21 except that the Res-Network 2205 is used instead of the U-network 2105. Therefore, an overlapped description is omitted.

Figure 23:
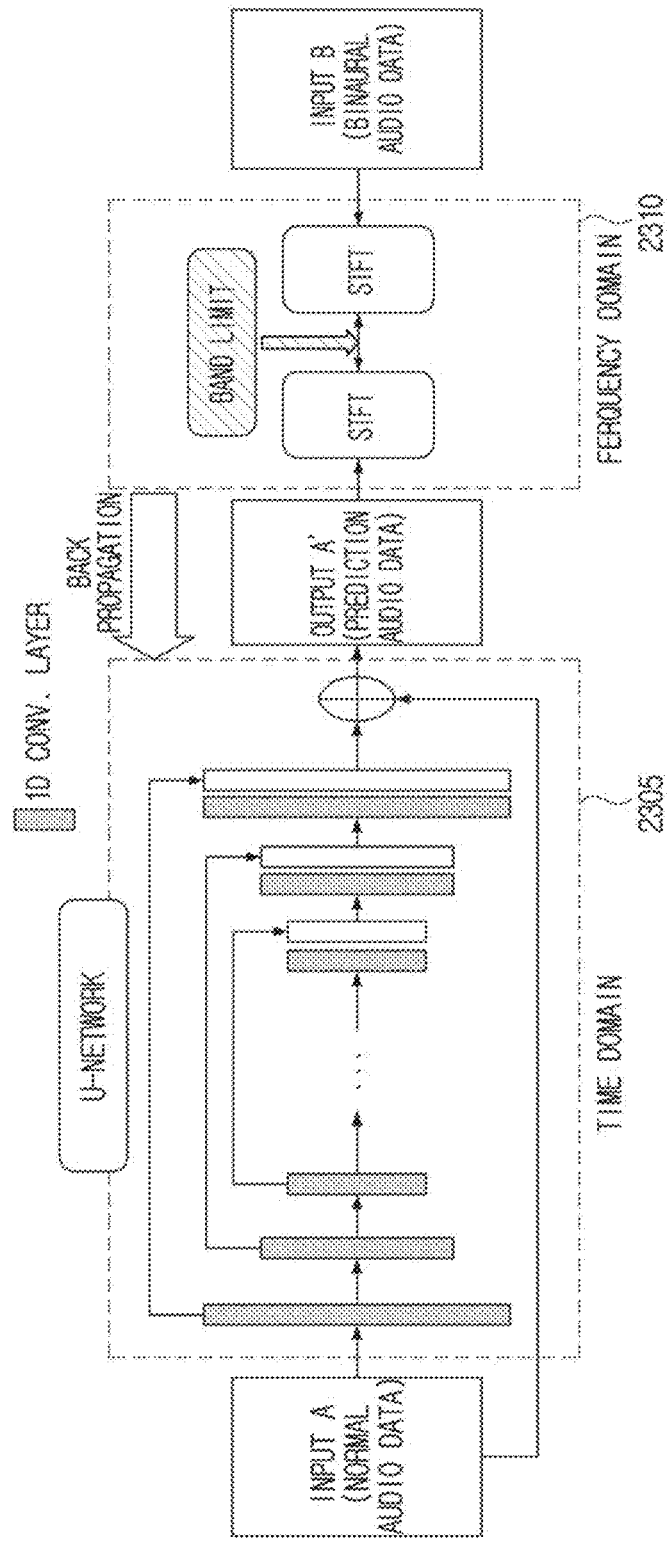
FIG. 23 is a diagram for describing still another example of a process of learning an artificial intelligence model for converting audio data.

FIG. 23 is a diagram for describing still another example of a process of learning an artificial intelligence model for converting audio data.

Referring to FIG. 23, the neural network may learn using a U-network 2305 and a loss value calculation module 2310. Here, the loss value calculation module 2310 may perform a calculation operation in a frequency domain, and calculate a loss value by limiting a specific frequency band. For example, the loss value calculation module 2310 may calculate the loss value by considering only data from a first frequency to a second frequency greater than the first frequency. If the loss value is calculated by limiting the specific frequency band, unnecessary processing operations may be eliminated in the loss value calculation module 2310 and a processing time may be shortened.

Operations other than the operation of calculating the loss value by considering the specific frequency band in the loss value calculation module 2310 may be the same as those described with reference to FIG. 21. Therefore, an overlapped description is omitted.

Figure 24:
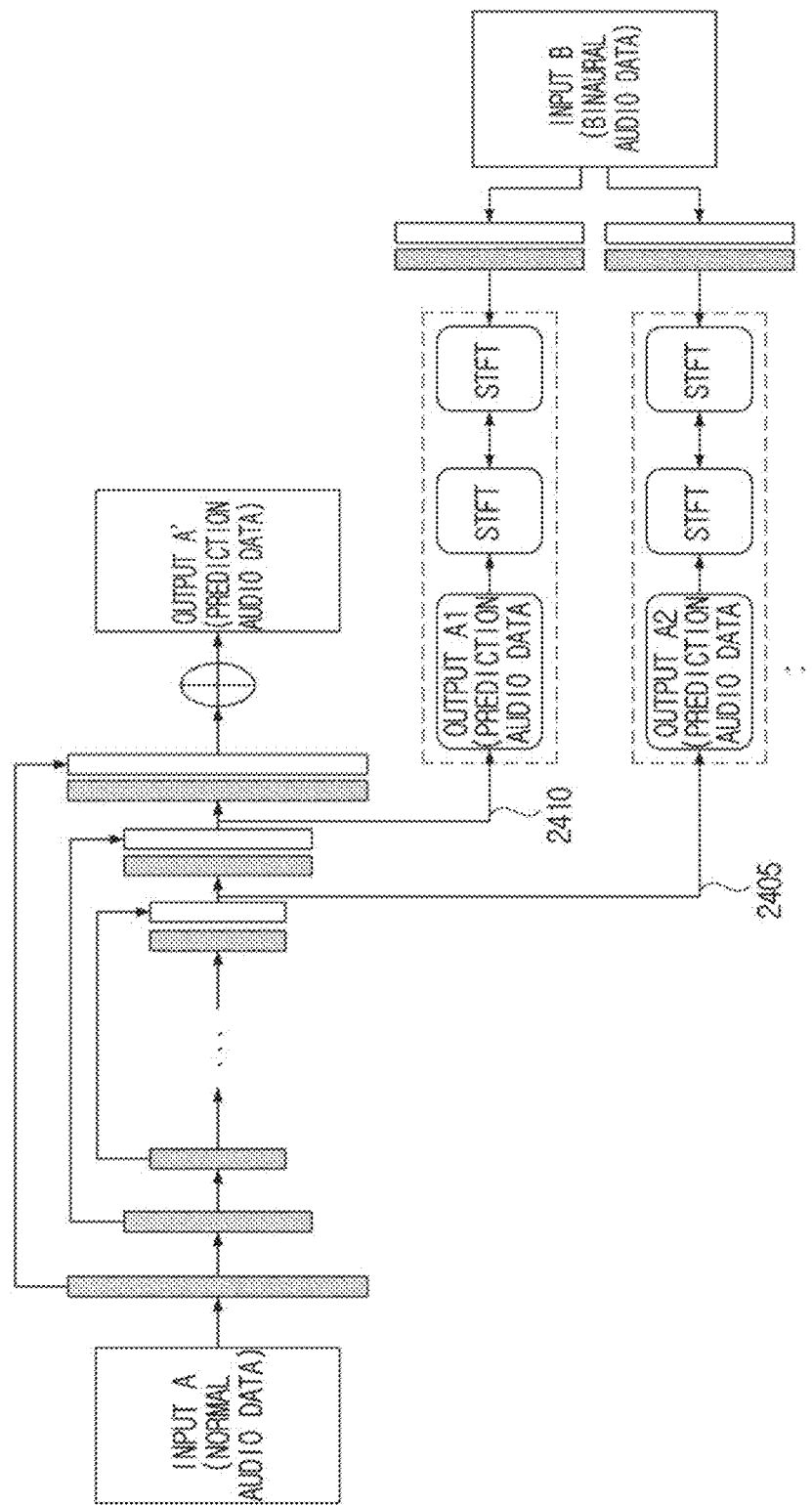
FIG. 24 is a diagram for describing still another example of a process of learning an artificial intelligence model for converting audio data.

FIG. 24 is a diagram for describing still another example of a process of learning an artificial intelligence model for converting audio data.

Referring to FIG. 24, the neural network may generate a plurality of prediction audio data (A', A1, A2) whenever normal audio data passes through a plurality of layers through a U-network. Specifically, the neural network may generate the prediction audio data A1 in a layer before generating final prediction audio data A'. In addition, the neural network may generate the prediction audio data A2 in a layer before generating the prediction audio data A1. In addition, the neural network may calculate a first loss value in a frequency domain based on the prediction audio data A1 and binaural audio data (i.e., input B). In addition, the neural network may calculate a second loss value in the frequency domain based on the prediction audio data A2 and the binaural audio data (i.e., input B). In addition, the neural network may perform a back propagation operation based on the first loss value and the second loss value, and may learn to obtain the artificial intelligence model 1000.

That is, the neural network may calculate the loss values based on intermediate prediction audio data (A1, A2) in addition to the final prediction audio data A'. In addition, the neural network may perform the back propagation operation by considering all the plurality of loss values obtained based on the plurality of prediction audio data (A', A1, A2) and change the weight used in the learning process.

Meanwhile, in FIG. 24, although the binaural audio data (i.e., input B) is described as calculating the loss values based on the prediction audio data A1 and the prediction audio data A2, the loss value may be additionally calculated based on the binaural audio data (i.e., input B) and the prediction audio data A', and if necessary, an additional layer may generate additional prediction audio data to calculate the loss value.

Meanwhile, operations other than those additionally described in FIG. 24 are the same as those in FIG. 21, and thus a detailed description thereof will be omitted.

Figure 25:
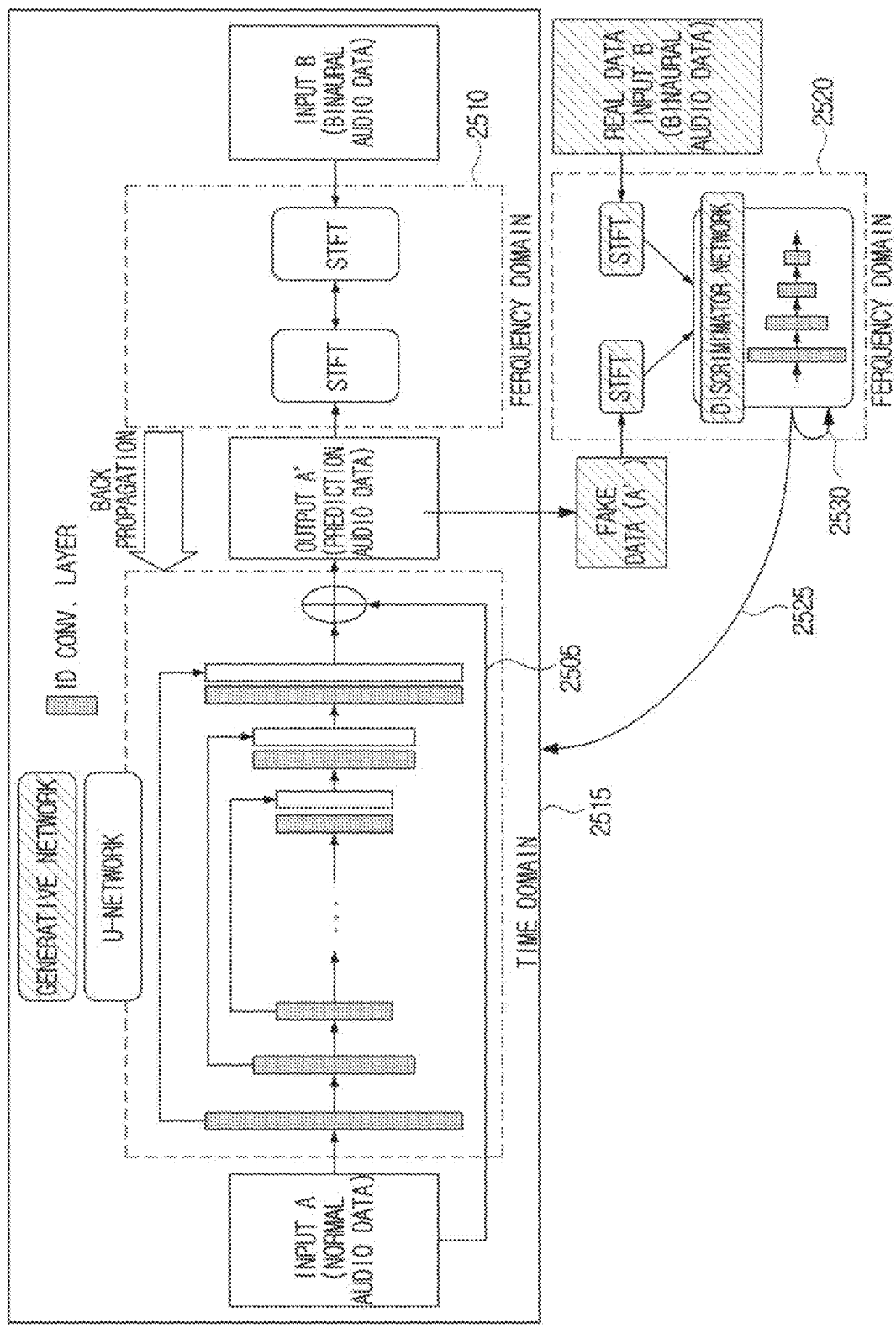
FIG. 25 is a diagram for describing still another example of a process of learning an artificial intelligence model for converting audio data by a generative adversarial network.

FIG. 25 is a diagram for describing still another example of a process of learning an artificial intelligence model for converting audio data by a generative adversarial network.

Referring to FIG. 25, the neural network may be a generative adversarial network (GAN). In addition, the generative adversarial network may include a generative network 2515 for generating fake data and a discriminator network 2520 for determining authenticity of the fake data.

The generative network 2515 may include a U-network 2505 and a loss value calculation module 2510, and a detailed operation thereof will be omitted because it is redundant with the description in FIG. 21. Here, the generative network 2515 may generate fake data A' based on prediction audio data A'.

The discriminator network 2520 may determine whether the fake data A' generated by the generative network 2515 is real data or fake data A'. Specifically, the discriminator network 2520 may perform short-time Fourier transform (STFT) on the fake data A', perform short-time Fourier transform on the binaural audio data (i.e., real data, input B), and obtain a loss value in a frequency domain based on the transformed fake data A' and the transformed binaural audio data. Here, the discriminator network 2520 according to an embodiment may perform a back propagation operation on the generative network 2515 based on the obtained loss value. The discriminator network 2520 according to another embodiment may perform the back propagation operation on the discriminator network 2520 itself based on the obtained loss value.

In addition, the generative network 2515 may generate new fake data based on the loss value generated by the discriminator network 2520, and the neural network may finally obtain the artificial intelligence model 1000 through an iterative learning operation.

Figure 26:
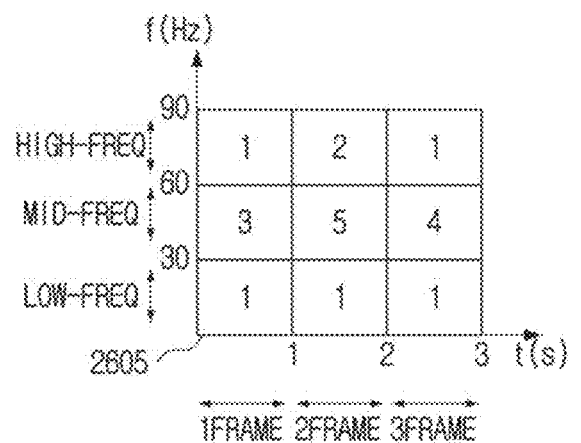
FIG. 26 is a diagram for describing a spectrogram reflecting normal audio data.
Figure 26:
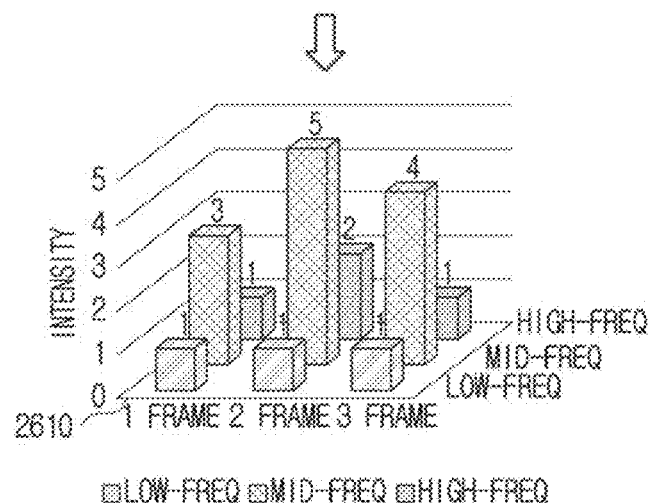
Figure 27:
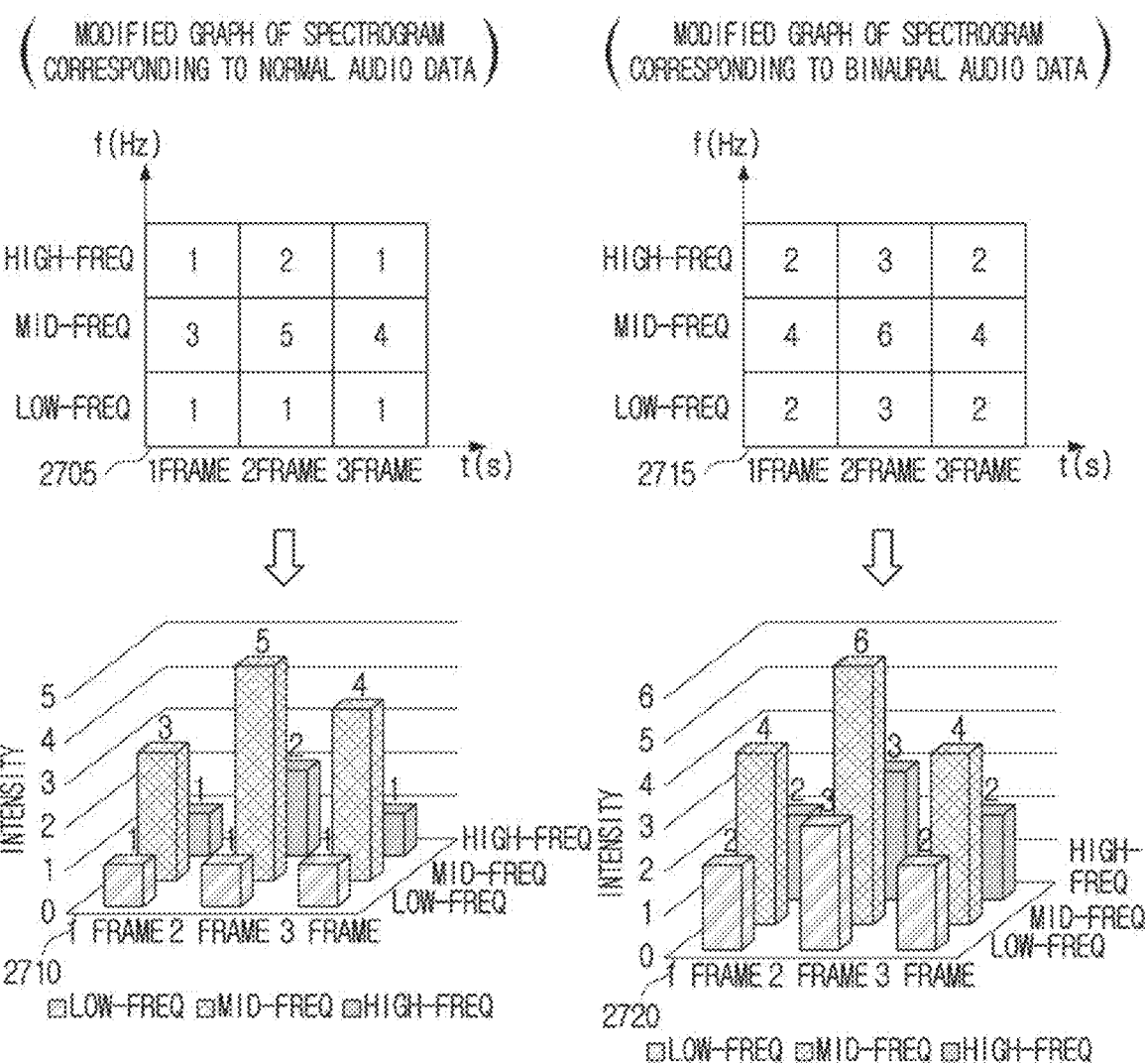
FIG. 27 is a diagram for describing a spectrogram reflecting normal audio data and binaural audio data, respectively.
Figure 28:
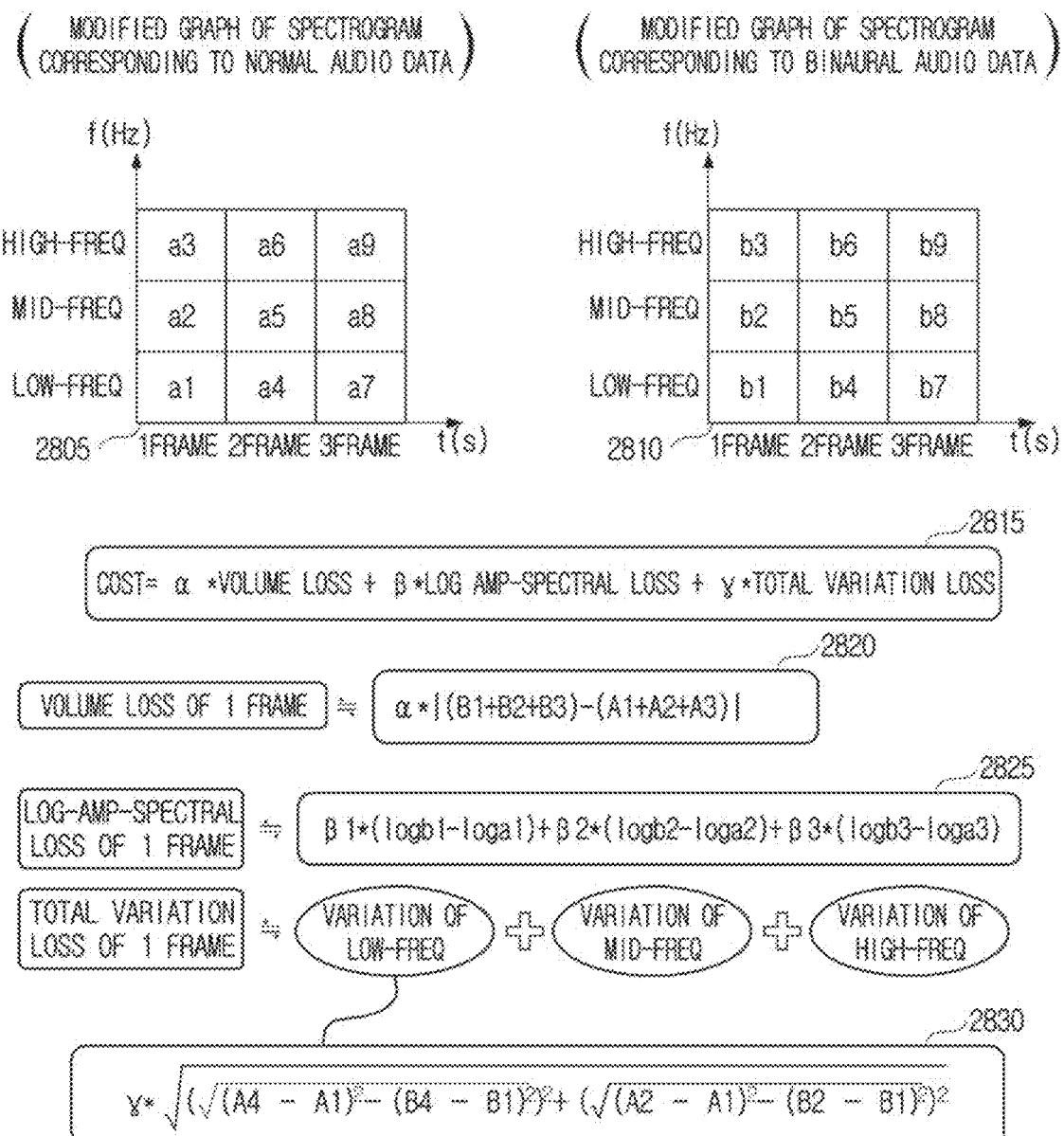
FIG. 28 is a diagram for describing a process of obtaining a loss value by comparing normal audio data and binaural audio data in a frequency diagram.

FIGS. 26 to 28 are diagrams for describing a loss value calculation operation. FIGS. 26 to 28 include the contents related to a spectrogram. The spectrogram may be a graph representing a difference in amplitude according to a change in time and frequency axes as a difference in print density or display color. The spectrogram may be in the form of a continuous two-dimensional graph as disclosed in FIGS. 29 and 30. However, for convenience of explanation, an existing spectrogram is modified and described in FIGS. 26 to 28. In addition, it is assumed that an x-axis is a time axis and is divided by one second and one frame is received in one second for convenience of explanation. In addition, it is assumed that a y axis is a frequency axis and is divided into three frequencies of low frequency, mid frequency, and high frequency for convenience of explanation. The contents described in FIGS. 26 to 28 are conceptually illustrated to simplify an actual spectrogram and a calculation process. Therefore, each data is illustrated as discrete in FIGS. 26 to 28, but may be in a continuous form in the actual spectrogram.

FIG. 26 is a diagram for describing a spectrogram reflecting normal audio data.

Referring to FIG. 26, a modified spectrogram 2605 corresponding to normal audio data may be illustrated according to a frame and a frequency. Here, the normal audio data may be learning data used to obtain the artificial intelligence model 1000.

Referring to a 2D graph 2605, an x axis may refer to a frame for each section, and a y axis may refer to regions corresponding to a low frequency, a mid frequency, and a high frequency. The numbers described in the graph may refer to a magnitude (or intensity) of a frequency signal. Here, the magnitude of the frequency signal may be a relative magnitude. The magnitude of the low frequency signal of a 1 frame may be 1, the magnitude of the mid frequency signal thereof may be 3, and the magnitude of the high frequency signal thereof may be 1. In addition, the magnitude of the low frequency signal of a 2 frame may be 1, the magnitude of the mid frequency signal thereof may be 5, and the magnitude of the high frequency signal thereof may be 2. In addition, the magnitude of the low frequency signal of a 3 frame may be 1, the magnitude of the mid frequency signal thereof may be 4, and the magnitude of the high frequency signal thereof may be 1.

When the magnitude of the frequency signal is taken as a z axis, the 2D graph 2605 may be represented by a 3D graph 2610. Referring to the 3D graph 2610, in the 1, 2, and 3 frames of the normal audio data, the frequency signal may have a constant magnitude for a low frequency region and may have a relatively high frequency signal magnitude for a mid frequency region.

FIG. 27 is a diagram for describing a spectrogram reflecting normal audio data and binaural audio data, respectively.

The neural network 2000 may be learned using the normal audio data and the binaural audio data as illustrated in FIG. 6.

Referring to FIG. 27, a 2D graph 2705 illustrates a frequency signal of normal audio data, and the 2D graph 2705 may be changed into a 3D graph 2710 by taking the magnitude of the frequency signal as the z axis and illustrating in the 3D form as illustrated in FIG. 26.

Meanwhile, the binaural audio data corresponding to the normal audio data may be represented by a 2D graph 2715. The magnitude of the low frequency signal of a 1 frame may be 2, the magnitude of the mid frequency signal thereof may be 4, and the magnitude of the high frequency signal thereof may be 2. In addition, the magnitude of the low frequency signal of a 2 frame may be 3, the magnitude of the mid frequency signal thereof may be 6, and the magnitude of the high frequency signal thereof may be 3. In addition, the magnitude of the low frequency signal of a 3 frame may be 2, the magnitude of the mid frequency signal thereof may be 4, and the magnitude of the high frequency signal thereof may be 2.

In addition, when the magnitude of the frequency signal is taken as the z axis, the 2D graph 2715 of the binaural audio data may be represented by a 3D graph 2720.

Referring to FIG. 27, even if the same sound source is used, the magnitude of the frequency signal may vary according to the recording device. The neural network 2000 may calculate a loss value based on a difference between the normal audio data and the binaural audio data. Specific operations related to the loss value will be described later with reference to FIG. 28.

FIG. 28 is a diagram for describing a process of obtaining a loss value by comparing normal audio data and binaural audio data in a frequency diagram.

Referring to FIG. 28, the neural network 2000 may use frequency magnitude information of the normal audio data and frequency magnitude information of the binaural audio data to calculate a loss value. For convenience of explanation, it is assumed that only 1 to 3 frames exist, and it is assumed that a frequency is divided into a low frequency, a mid frequency, and a high frequency.

In relation to the normal audio data, the magnitude of the low frequency signal of a 1 frame may be a1, the magnitude of the mid frequency signal thereof may be a2, and the magnitude of the high frequency signal thereof may be a3. In addition, the magnitude of the low frequency signal of a 2 frame may be a4, the magnitude of the mid frequency signal thereof may be a5, and the magnitude of the high frequency signal thereof may be a6. In addition, the magnitude of the low frequency signal of a 3 frame may be a7, the magnitude of the mid frequency signal thereof may be a8, and the magnitude of the high frequency signal thereof may be a9.

In relation to the binaural audio data, the magnitude of the low frequency signal of the 1 frame may be b1, the magnitude of the mid frequency signal thereof may be b2, and the magnitude of the high frequency signal thereof may be b3. In addition, the magnitude of the low frequency signal of the 2 frame may be b4, the magnitude of the mid frequency signal thereof may be b5, and the magnitude of the high frequency signal thereof may be b6. In addition, the magnitude of the low frequency signal of the 3 frame may be b7, the magnitude of the mid frequency signal thereof may be b8, and the magnitude of the high frequency signal thereof may be b9.

The neural network 2000 may calculate a total loss value based on a volume loss value, a spectral loss value or a log-amp-spectral loss value, and a variation loss value. In the learning process, because normal audio data transformation and loss value calculation process are performed in different domains (cross domain), in order to reduce an error caused thereby and increase the performance, the total loss value may be calculated based on the volume loss value, the spectral loss value or the log-amp-spectral loss value, and the variation loss value.

The volume loss value may refer to a loss value obtained by considering a frequency magnitude at a specific time. Here, the frequency magnitude at the specific time may refer to transforming the magnitude of the entire frequency band into one value. The transform operation may be to add magnitudes or to average the magnitudes, and various mathematical methods may be used.

In addition, the spectral loss value may refer to a loss value obtained based on a difference in magnitude of a signal for each frequency band. Specifically, the spectral loss value may be obtained based on the difference in the magnitude of the signal at a specific time and at a specific frequency band. Here, the neural network 2000 may obtain an amplitude component of the audio data to determine the magnitude of the signal and apply a log function to a magnitude value of the signal. The amp described in mathematic expression 2815 may refer to amplitude. Meanwhile, it is assumed that values for a1 to a9 and b1 to b9 refer to the magnitude value of the signal. Therefore, a description of a process of obtaining an amplitude component is omitted.

In addition, the variation loss value may refer to a loss value obtained by considering noise information. Specifically, the variation loss value may be obtained by considering at least one of a difference in magnitude of a signal of a surrounding frequency or a difference in magnitude of a signal of a surrounding frame.

Here, the neural network 2000 may use a weight corresponding to each of the volume loss value, the spectral loss value, and the variation loss value. Specifically, alpha ($\alpha$) for the volume loss value, beta ($\beta$) for the spectral loss value, and gamma ($\gamma$) for the variation loss value may be used as weights. In addition, the process of calculating the loss value may be represented by Mathematic expression 2815 disclosed in FIG. 28. In the mathematic expression 2815, although it is described that the loss value is calculated using all of the volume loss value, the spectral loss value, and the variation loss value, the loss value may be obtained using at least one of the volume loss value, the spectral loss value, or the variation loss value according to an implementation example.

For convenience of explanation, a process of calculating the volume loss value, the spectral loss value, and the variation loss value for only a1 frame will be described. In addition, the calculation process disclosed in FIG. 28 describes a schematic calculation process in order to understand the concept, and various mathematical models may be applied to an actual loss value in addition to the description.

The volume loss value of the 1 frame may be obtained based on mathematic expression 2820. Specifically, the neural network 2000 may obtain a difference between a value (b1+b2+b3) obtained by summing all magnitudes of a signal for each frequency band of a1 frame of the binaural audio data and a value (a1+a2+a3) obtained by summing all magnitudes of a signal for each frequency band of a1 frame of the normal audio data, and may obtain the volume loss value by reflecting the weight alpha (a) corresponding to the volume loss value to an absolute value of the obtained difference value. The neural network 2000 may determine the weight alpha ($\alpha$) corresponding to the volume loss value through iterative learning.

The spectral loss value of the 1 frame may be obtained based on mathematic expression 2825. Specifically, the neural network 2000 may obtain a signal size b1 of a low frequency band in the 1 frame of the binaural audio data and a signal size a1 of a low frequency band in the 1 frame of the normal audio data. In addition, the neural network 2000 may obtain a difference value (log b1−log a1) by using a log function for the respective signal magnitudes b1 and a1. In the same manner, a signal magnitude difference value (log b2−log a2) for the medium frequency and a signal magnitude difference value (log b3−log a3) for the high frequency may be obtained. Here, the spectral loss value may be obtained based on different weights for each frequency band. Specifically, weights for beta 1 ($\beta1$) at the low frequency, beta 2 ($\beta2$) at the mid frequency, and beta 3 ($\beta3$) at the high frequency may be used. The neural network 2000 may determine the weight beta ($\beta1, \beta2, \beta3, \ldots$) according to the frequency band through iterative learning. Here, by adjusting the weight according to the frequency band, the embodiment of calculating the loss value by limiting the specific frequency band disclosed in FIG. 23 may be implemented. For example, in order to calculate the loss value by considering only the mid frequency band, the neural network 2000 may set beta 1 ($\beta1$) and beta 3 ($\beta3$) to 0 and beta 2 ($\beta2$) to 1.

The variation loss value of the 1 frame may reflect values for low frequency variation, mid frequency variation, and high frequency variation. The variation loss value may reflect a difference in signal magnitudes of surrounding frames based on the same frequency band.

The loss value calculation for the low frequency variation may be obtained based on mathematic expression 2830. For example, the neural network 2000 may calculate a difference (a4−a1) of a signal magnitude a1 of the 1 frame and a signal magnitude a4 of the 2 frame based on the low frequency with respect to the normal audio data. In addition, the neural network 2000 may calculate a difference (b4−b1) of a signal magnitude b1 of the 1 frame and a signal magnitude b4 of the 2 frame based on the low frequency with respect to the binaural audio data. Meanwhile, the variation loss value may calculate a difference in signal magnitudes of surrounding frequency bands based on the same frame. For example, the neural network 2000 may calculate a difference (a2−a1) of a signal magnitude a1 of the low frequency band and a signal magnitude a2 of the mid frequency band based on the 1 frame with respect to the normal audio data. In addition, the neural network 2000 may calculate a difference (b2−b1) of a signal magnitude b1 of the low frequency band and a signal magnitude b2 of the mid frequency band based on the 1 frame with respect to the binaural audio data. The neural network 2000 may obtain a loss value for the low frequency variation based on the weight gamma ($\gamma$). A mid frequency variation loss value and a high frequency variation loss value may be calculated similarly to the low frequency variation loss value, and a detailed description of the calculation process is omitted. In addition, the neural network 2000 may obtain a total variation loss value of the 1 frame by combining the values of the low frequency variation, the mid frequency variation, and the high frequency variation with respect to the 1 frame.

The neural network 2000 may calculate the total loss value based on at least one loss value of the volume loss value, the spectral loss value, or the variation loss value of the entire frame. In addition, the neural network 2000 may perform a back propagation operation based on the obtained total loss value and perform the iterative learning. The neural network 2000 may analyze a relationship between the normal audio data and the binaural audio data by the iterative learning, and generate the artificial intelligence model 1000 for performing the binaural rendering.

Figure 29:
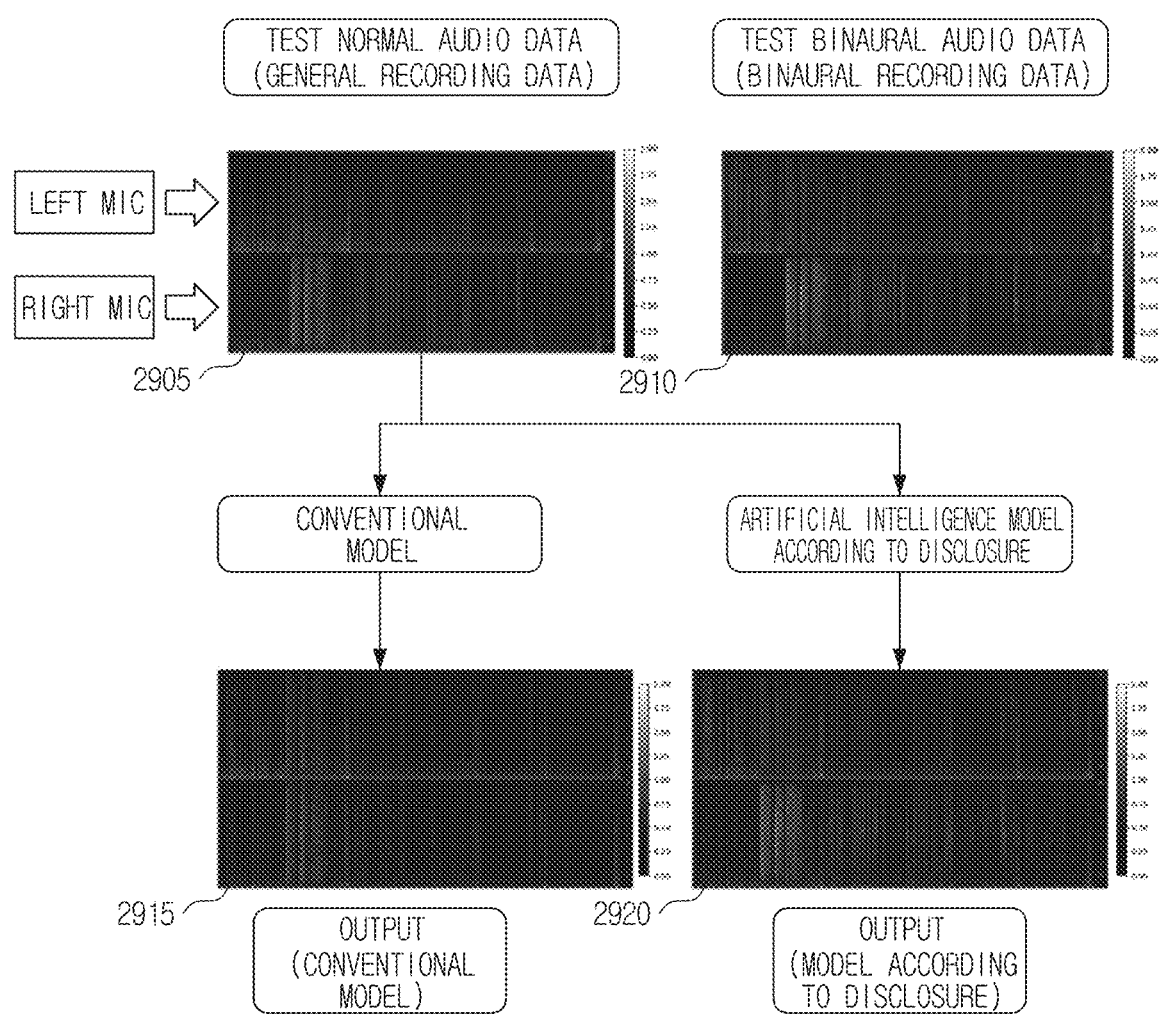
FIG. 29 is a diagram according to an example for comparing the effects of a conventional model and a model according to the disclosure.

FIG. 29 is a diagram according to an example for comparing the effects of a conventional model and a model according to the disclosure.

Referring to FIG. 29, 2D graphs 2905, 2910, 2915, and 2920 may be spectrograms of audio data. An x axis refers to a time axis, a y axis refers to a frequency, and a difference in color tone made of achromatic colors may refer to the magnitude of the signal for each frequency. The difference in the color tone between white and black may mean that the frequency signal has a different magnitude depending on the color tone. Here, the magnitude of the frequency signal according to the color tone represented by 0 to 2 may mean a relative magnitude and may not be an actual measurement magnitude.

To test the performance of the disclosure, it is assumed that there is normal audio data recorded by a general recording device including a left microphone and a right microphone and binaural audio data recorded by a binaural recording device including a left microphone and a right microphone. Here, it is assumed that the normal audio data and the binaural audio data are data obtained by recording the same sound source except for different recording devices.

A spectrogram 2910 of the binaural audio data obtained by recording the same sound source as the normal audio data is different from a spectrogram 2905 of the normal audio data. Due to such a difference, a user who listens to the audio data may feel a binaural effect.

The artificial intelligence model 1000 generated by the neural network 2000 aims to transform the normal audio data into audio data similar to the binaural audio data by performing the binaural rendering on the normal audio data. Therefore, as a spectrogram of general audio data (a spectrogram of the transformed audio data) on which the rendering operation is performed is similar to the spectrogram 2910 of the binaural audio data, it may be determined that the performance of the rendering model is better.

When a conventional model (e.g., a conventional audio rendering program) is applied based on the spectrogram 2905 of the normal audio data, a spectrogram 2915 of output audio data based on the conventional model may be obtained.

When the artificial intelligence model 1000 according to the disclosure is applied based on the spectrogram 2905 of the normal audio data, a spectrogram 2920 of output audio data based on the artificial intelligence model 1000 according to the disclosure may be obtained.

Through the fact that the spectrogram 2920 of the output audio data based on the artificial intelligence model 1000 according to the disclosure is similar to the spectrogram 2910 of the binaural audio data rather than the spectrogram 2915 of the output audio data based on the conventional model, it may be determined that the rendering by the artificial intelligence model 1000 according to the disclosure has a greater binaural effect, at least in terms of signal.

Figure 30:
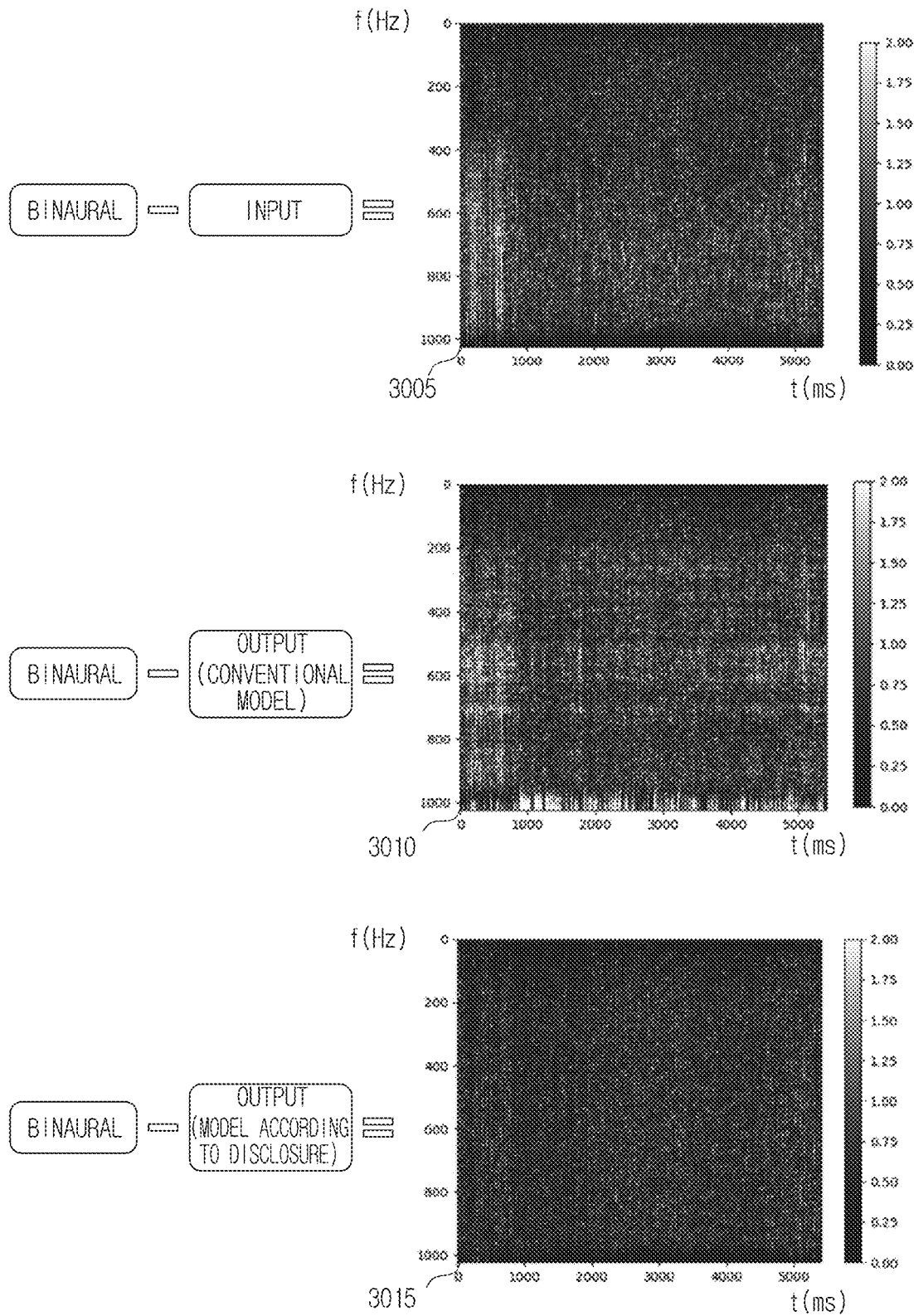
FIG. 30 is a diagram according to another example for comparing the effects of a conventional model and a model according to the disclosure.

FIG. 30 is a diagram according to another example for comparing the effects of a conventional model and a model according to the disclosure.

Referring to FIG. 30, the effects may be compared through the difference between the output audio data based on the conventional model and the output audio data based on the artificial intelligence model 1000 according to the disclosure.

As described with reference to FIG. 29, for the test, it is assumed that the normal audio data and the binaural audio data are recorded based on the same sound source. A spectrogram 3005 according to a difference value between the binaural audio data and the normal audio data may represent a difference in the magnitude of the frequency signal according to the achromatic color tone. A portion corresponding to black may have a small difference, and a portion corresponding to white may have a large difference. Therefore, in the spectrogram 3005, a region where a white portion is displayed may be determined as a region where the difference between the normal audio data and the binaural audio data occurs.

Meanwhile, a spectrogram 3010 according to a difference value between the output audio data based on the conventional model and the binaural audio data may have more white regions than the spectrogram 3005. A large white region may mean that the difference between the binaural audio data and the output audio data based on the conventional model is large, and may mean that the binaural effect of the output audio data based on the conventional model is small. The reason may be that the conventional model does not perform binaural rendering properly or merely performs an improvement of sound quality or a stereo conversion operation.

Meanwhile, a spectrogram 3015 according to a difference value between the output audio data based on the artificial intelligence model 1000 according to the disclosure and the binaural audio data may have a smaller white region than the spectrogram 3005. The small white region may mean that the output audio data based on the artificial intelligence model 1000 is similar to the binaural audio data.

The spectrogram 3005 based on the difference value of the data to which the binaural rendering is not applied and the spectrogram 3010 based on the conventional model may have a large white region, and a large difference with the binaural data may thus occur. However, because the spectrogram 3015 based on the artificial intelligence model 1000 according to the disclosure has the small while region and there is very little difference with the binaural audio data, it may be determined that the output audio data by the artificial intelligence model 1000 has a large binaural effect.

Figure 31:
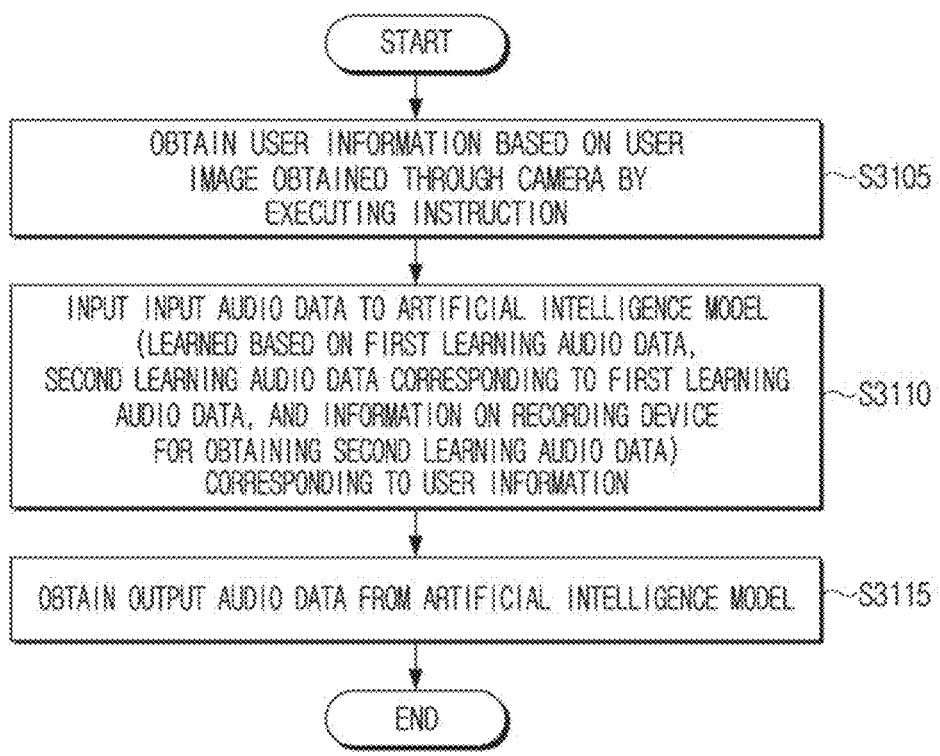
FIG. 31 is a diagram for describing a controlling method of an electronic apparatus according to an embodiment of the disclosure.

FIG. 31 is a diagram for describing a controlling method of an electronic apparatus according to an embodiment of the disclosure.

Referring to FIG. 31, a controlling method of an electronic apparatus 100 that stores at least one instruction according to an embodiment of the disclosure may include obtaining user information based on a user image obtained through a camera 115 by executing the instruction (S3105), inputting input audio data to an artificial intelligence model 1000 corresponding to the user information (S3110), and obtaining output audio data from the artificial intelligence model 1000 (S3115). Here, the artificial intelligence model 1000 may be a model learned based on first learning audio data obtained by recording a sound source with a first recording device, second learning audio data obtained by recording the sound source with a second recording device, and information on a recording device for obtaining the second learning audio data, and the second learning audio data may be binaural audio data.

Here, the controlling method may further include identifying whether or not a sound output device is connected to an outputter and displaying a guide UI for guiding the connection of the sound output device on the display 160 based on identifying that the sound output device is not connected to the outputter, and the sound output device may be at least one of an earphone or a headphone.

In addition, in the inputting of the input audio data (S3110), based on at least one of context information of the electronic apparatus 100 or information on a space where a user is located being obtained, the input audio data may be input to the artificial intelligence model 1000 corresponding to at least one of the context information of the electronic apparatus 100 or the information on the space where the user is located, and the artificial intelligence model 1000 may be a model learned based on at least one of the context information of the electronic apparatus 100 or the information on the space where the user is located, the first learning audio data, the second learning audio data, and the information on the recording device for obtaining the second learning audio data.

Here, the context information of the electronic apparatus 100 may include at least one of information on an application executed in the electronic apparatus 100 or audio volume information set in the electronic apparatus 100.

In addition, the context information of the electronic apparatus 100 may be information on an application executed in the electronic apparatus 100, and the controlling method may further include displaying a UI that inquires whether to obtain the output audio data from the artificial intelligence model 1000, based on the application executed in the electronic apparatus 100 being an audio related application.

Meanwhile, the user information may include at least one of user body information or user identification information, the user body information may include at least one of a user head size, a user head shape, a user head circumference, a position of the user's ear, a user ear shape, or a user ear size, and the user identification information may include at least one of user gender, user age, or user hearing.

In addition, the recording device may include at least one of a human head model, a human ear model, or a plurality of microphones, and the information on the recording device for obtaining the second learning audio data may include information on at least one of a human head model size, a human head model shape, a human ear model size, or a human ear model shape.

In addition, the artificial intelligence model 1000 is a model learned based on the first learning audio data, the second learning audio data, the information on the recording device for obtaining the second learning audio data, and information on a recording situation of the first learning audio data and the second learning audio data, and the information on the recording situation may include at least one of sound source distance information (e.g., recording distance information) or recording space information. Here, in the controlling method, based on the application executed in the electronic apparatus being an application related to a virtual space, virtual space content including the sound source information and the space information may be obtained, and the input audio data may be input to an artificial intelligence model corresponding to the obtained virtual space content.

On the other hand, the methods according to the diverse embodiments of the disclosure described above may be implemented in the form of an application installable on an existing electronic apparatus.

In addition, the methods according to the diverse embodiments of the disclosure described above may be implemented by only upgrading software or hardware of the existing electronic apparatus.

In addition, the diverse embodiments of the disclosure described above may also be performed through an embedded server included in the electronic apparatus, or an external server of at least one of the electronic apparatus or the display device.

Meanwhile, a non-transitory computer readable medium storing computer instructions for causing an electronic apparatus 100 to perform an operation in which the operation includes obtaining user information based on a user image obtained through a camera 115, inputting input audio data to an artificial intelligence model 1000 corresponding to the user information, and obtaining output audio data from the artificial intelligence model 1000, in which the artificial intelligence model 1000 is a model learned based on first learning audio data obtained by recording a sound source with a first recording device, second learning audio data obtained by recording the sound source with a second recording device, and information on a recording device for obtaining the second learning audio data, and the second learning audio data is binaural audio data.

Meanwhile, according to an embodiment of the disclosure, the diverse embodiments described hereinabove may be implemented by software including instructions that are stored in machine (e.g., a computer)-readable storage media. The machine is an apparatus that invokes the stored instructions from the storage media and is operable according to the invoked instructions, and may include the electronic apparatus (e.g., an electronic apparatus A) according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage media may be provided in the form of non-transitory storage media. Here, the term 'non-transitory' means that the storage medium does not include a signal and is tangible, but does not distinguish whether data is stored semi-permanently or temporarily in the storage medium.

In addition, according to an embodiment of the disclosure, the method according to the diverse embodiments described above may be included and provided in a computer program product. The computer program product may be traded as a product between a seller and a purchaser. The computer program product may be distributed in the form of a machine readable storage media (e.g., a compact disc read only memory (CD-ROM)), or online through an application store (e.g., PlayStore™). In case of the online distribution, at least a portion of the computer program product may be at least temporarily stored in a storage medium such as a memory of a server of a manufacturer, a server of an application store, or a relay server, or be temporarily generated.

In addition, each of the components (e.g., modules or programs) according to the diverse embodiments described above may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be performed in a sequential, parallel, iterative, or heuristic manner, or at least some operations may be executed in a different order or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. Such modifications should not be individually understood from the technical spirit or the prospect of the disclosure.

What is claimed is:

1. An electronic apparatus comprising:
   at least one camera;
   a processor; and
   a memory storing instructions, wherein the instructions are configured to, when executed by the processor, cause the electronic apparatus to:
     identify a sound output device connected to the electronic apparatus,
     obtain body information of a user based on at least one image of the user captured through the at least one camera,
     select an audio related application based on a user input,
     based on the selected audio related application being an application for applying an audio conversion, apply the audio conversion on an audio signal for the application to obtain a converted audio signal based on the identified sound output device and the obtained body information, and
     transmit the converted audio signal to the sound output device.

2. The electronic apparatus as claimed in claim 1, wherein the applied audio conversion is associated with a first audio conversion model in case that the identified sound output device corresponds to a first sound output device, and
   the applied audio conversion is associated with a second audio conversion model in case that the identified sound output device corresponds to a second sound output device.

3. The electronic apparatus as claimed in claim 2, wherein the first audio conversion model and the second audio conversion model are generated based on artificial intelligence (AI) learning using first audio data, second audio data different from the first audio data and body information.

4. The electronic apparatus as claimed in claim 2, wherein the first audio conversion model and the second audio conversion model are stored in the memory.

5. The electronic apparatus as claimed in claim 2, wherein the instructions are configured to, when executed by the processor, further cause the electronic apparatus:
   to modify the first audio conversion model or the second audio conversion model based on the obtained body information.

6. The electronic apparatus as claimed in claim 1, wherein the obtained body information comprises information associated with at least one of the user's head size, head shape, head circumference, ear position, ear shape, ear size, face size, or face shape.

7. The electronic apparatus as claimed in claim 1, wherein the at least one image of the user comprises a face of the user.

8. The electronic apparatus as claimed in claim 1, wherein the at least one camera comprises a front camera.

9. The electronic apparatus as claimed in claim 1, wherein the instructions are configured to, when executed by the processor, further cause the electronic apparatus to:
   identify whether the sound output device is at least one of earphones or headphones in contact with a body of the user.

10. The electronic apparatus as claimed in claim 1, wherein the audio conversion comprises binaural rendering on the audio signal.

11. The electronic apparatus as claimed in claim 1, further comprising:
    a display,
    wherein the instructions are configured to, when executed by the processor, further cause electronic apparatus to:
      control the display to display a user interface (UI) for selecting whether to apply the audio conversion in the electronic apparatus, and
      apply the audio conversion in the electronic apparatus based on a selection for applying the audio conversion through the UI.

12. The electronic apparatus as claimed in claim 1, wherein the instructions are configured to, when executed by the processor, further cause the electronic apparatus to, based on the selected audio related application being the application for applying the audio conversion, apply the audio conversion on the audio signal for the application based on a type of the identified sound output device and the obtained body information.

13. The electronic apparatus as claimed in claim 1, wherein the instructions are configured to, when executed by the processor, further cause the electronic apparatus to:
    apply the audio conversion on the audio signal based on an audio conversion model,
    modify a parameter of the audio conversion model based on the obtained body information of the user, and
    apply the audio conversion on the audio signal based on the audio conversion model having the modified parameter.

14. A method for controlling an electronic apparatus, the method comprising:
    identifying a sound output device connected to the electronic apparatus,
    obtaining body information of a user based on at least one image of the user captured through at least one camera,
    selecting an audio related application based on a user input,
    based on the selected audio related application being an application for applying an audio conversion, applying the audio conversion on an audio signal for the application to obtain a converted audio signal based on the identified sound output device and the obtained body information, and
    transmitting the converted audio signal to the sound output device.

15. The method as claimed in claim 14, wherein the applied audio conversion is associated with a first audio conversion model in case that the identified sound output device corresponds to a first sound output device, and
    the applied audio conversion is associated with a second audio conversion model in case that the identified sound output device corresponds to a second sound output device.

16. The method as claimed in claim 15, wherein the first audio conversion model and the second audio conversion model are generated based on artificial intelligence (AI) learning using first audio data, second audio data different from the first audio data and body information.

17. The method as claimed in claim 15, wherein the first audio conversion model and the second audio conversion model are stored in the electronic apparatus.

18. The method as claimed in claim 15, further comprising:
modifying the first audio conversion model or the second audio conversion model based on the obtained body information.

19. The method as claimed in claim 14, wherein the obtained body information comprises information associated with at least one of the user's head size, head shape, head circumference, ear position, ear shape, ear size, face size, or face shape.

20. The method as claimed in claim 14, wherein the at least one image of the user comprises a face of the user.

21. The method as claimed in claim 14, wherein the at least one camera comprises a front camera.

22. The method as claimed in claim 14, further comprising:
identifying whether the sound output device is at least one of earphones or headphones in contact with a body of the user.

23. The method as claimed in claim 14, wherein the audio conversion comprises binaural rendering on the audio signal.

24. The method as claimed in claim 14, further comprising:
displaying a user interface (UI) for selecting whether to apply the audio conversion in the electronic apparatus, and
applying the audio conversion in the electronic apparatus based on a selection for applying the audio conversion through the UI.

25. The method as claimed in claim 14, further comprising:
based on the selected audio related application being the application for applying the audio conversion, applying the audio conversion on the audio signal for the application based on a type of the identified sound output device and the obtained body information.

26. The method as claimed in claim 14, further comprising:
applying the audio conversion on the audio signal based on an audio conversion model,
modifying a parameter of the audio conversion model based on the obtained body information of the user, and
applying the audio conversion on the audio signal based on the audio conversion model having the modified parameter.

27. A non-transitory computer readable medium storing computer instructions for causing an electronic apparatus to perform a method when executed by a processor of the electronic apparatus, wherein the method comprises:
identifying a sound output device connected to the electronic apparatus,
obtaining body information of a user based on at least one image of the user captured through at least one camera,
selecting an audio related application based on a user input,
based on the selected audio related application being an application for applying an audio conversion, applying the audio conversion on an audio signal for the application to obtain a converted audio signal based on the identified sound output device and the obtained body information, and
transmitting the converted audio signal to the sound output device.

28. The non-transitory computer readable medium as claimed in claim 27, wherein the audio conversion comprises binaural rendering on the audio signal.

29. The non-transitory computer readable medium as claimed in claim 27, further comprising:
displaying a user interface (UI) for selecting whether to apply the audio conversion in the electronic apparatus, and
applying the audio conversion in the electronic apparatus based on a selection for applying the audio conversion through the UI.

* * * * *